(12) United States Patent
Kobayashi

(10) Patent No.: US 8,873,175 B2
(45) Date of Patent: Oct. 28, 2014

(54) REFLECTIVE MATERIAL AND OPTICAL STRUCTURE

(75) Inventor: Tetsuro Kobayashi, Suita (JP)

(73) Assignee: Osaka University, Osaka (JP)

( * ) Notice: Subject to any disclaimer, the term of this patent is extended or adjusted under 35 U.S.C. 154(b) by 161 days.

(21) Appl. No.: 13/517,289

(22) PCT Filed: Dec. 21, 2010

(86) PCT No.: PCT/JP2010/072964
§ 371 (c)(1),
(2), (4) Date: Jun. 20, 2012

(87) PCT Pub. No.: WO2011/078147
PCT Pub. Date: Jun. 30, 2011

(65) Prior Publication Data
US 2013/0033772 A1 Feb. 7, 2013

(30) Foreign Application Priority Data

Dec. 21, 2009 (JP) ................................ 2009-289269
Mar. 2, 2010 (JP) ................................ 2010-045633

(51) Int. Cl.
*G02B 5/04* (2006.01)
*G02B 27/09* (2006.01)
(52) U.S. Cl.
CPC ............ *G02B 27/0994* (2013.01); *G02B 5/045* (2013.01)
USPC .......................................... 359/837; 359/834
(58) Field of Classification Search
None
See application file for complete search history.

(56) References Cited

U.S. PATENT DOCUMENTS

| | | | |
|---|---|---|---|
| 4,260,220 | A | 4/1981 | Whitehead |
| 5,745,632 | A | 4/1998 | Dreyer |
| 6,282,226 | B1 | 8/2001 | Furukawa |
| 6,612,729 | B1 | 9/2003 | Hoffman |
| 6,621,973 | B1 | 9/2003 | Hoffman |
| 2008/0080161 | A1 | 4/2008 | Saitoh et al. |
| 2010/0053970 | A1* | 3/2010 | Sato et al. ..................... 362/259 |

FOREIGN PATENT DOCUMENTS

| | | |
|---|---|---|
| JP | H11-53756 | 2/1999 |
| JP | H11-513812 | 11/1999 |
| JP | 2000-31586 | 1/2000 |
| JP | 2001-296566 | 10/2001 |
| JP | 2003-528346 | 9/2003 |
| JP | 2003-528425 | 9/2003 |
| JP | 2008-89977 | 4/2008 |

OTHER PUBLICATIONS

Kobayashi, T., "Completely Closed Optical Cavity Using Total Reflection, IEICE Technical Report, IEICE, 2012", pp. 85-90 (English Translation Attached).

(Continued)

*Primary Examiner* — Jade R Chwasz
(74) *Attorney, Agent, or Firm* — Casimir Jones SC

(57) ABSTRACT

A reflective material of the present invention is made of an optical medium which transmits light, and has (i) a first plane which is a surface on which inclined planes are aligned with no gap therebetween and (ii) a second plane which is opposite to the first plane and is a flat surface, and has the first plane having a shape and a refractive index such that at any time, light having entered the first plane or the second plane enters, at an entrance angle equal to or larger than a critical angle of total internal reflection, a corresponding opposite one of the first plane and the second plane directly from an inside of the reflective material.

9 Claims, 27 Drawing Sheets

(56) References Cited

OTHER PUBLICATIONS

Kobayashi, T., "Completely Closed Optical Shell Using Total Internal Reflection with Simple Composition," Japanese Journal of Applied Physics, 49 (2010) 092502, pp. 1-5.

Kobayashi, T., "Hollow light waveguides which can trap/guide any light ray having any direction. Proceedings of the 58th Spring Meeting, 2011 of the Japan Society of Applied Physics," 25p-KS-7 (English Abstract Attached).

Kobayashi, T., "Mysterious Closed Optical Boxes. Proceedings of the 57th Spring Meeting, 2010 of the Japan Society of Applied Physics, 18-K-1," (English Translation Attached).

* cited by examiner

REFLECTIVE MATERIAL AND OPTICAL STRUCTURE

CROSS-REFERENCE TO RELATED APPLICATIONS

The present application is a Section 371 U.S. national stage entry of pending International Patent Application No. PCT/JP2010/072964, International Filing Date Dec. 21, 2010, which published on Jun. 30, 2011 as Publication No. WO 2011/078147, which claims the benefit of Japanese Patent Application No. 2009-289269, filed Dec. 21, 2009, and Japanese Patent Application No. 2010-045633, filed Mar. 2, 2010, the contents of which are incorporated by reference in their entireties.

TECHNICAL FIELD

The present invention relates to (i) a reflective material which is capable of highly reflecting (including totally internally reflecting) light and is made of an optical medium, and (ii) optical structures such as a light guide and an optical resonator each of which is made of the reflective material.

BACKGROUND ART

The following exemplifies conventional reflective materials capable of highly reflecting light and conventional structures made of highly reflective materials.

(1) High Q optical resonator using dielectric sphere: Generally, a dielectric micro sphere having a micrometer size is used. Light circularly travels along an inner circumference of the dielectric micro sphere while being totally internally reflected. Therefore, a remarkably high Q optical resonator can be obtained though no reflecting mirror is provided. Such a remarkably high Q optical resonator is called Whispering Gallery Mode, and frequently used in scientific experiments. For example, such dielectric micro spheres are provided for use in a slow-wave circuit. Alternatively, such a dielectric micro sphere whose inside is doped with a pigment is used for a microsphere laser.

(2) Mirror ball: A sphere whose top surface is tightly covered with pieces of mirror, or an entertainment lighting apparatus that rotates a polyhedron by use of a motor. Millar ball irradiated with a spotlight dispersedly emits polka-dot light throughout a room, so as to create an air of fantasy.

(3) Natural or artificial jewel: A natural or artificial jewel has a remarkably high refractive index. Light having entered the natural or artificial jewel is easily totally internally reflected. Particularly, the natural or artificial jewel cut so as to have a polyhedral surface increases its brightness.

Patent Literature 1 discloses a lighting apparatus which is used as a front reflecting mirror by providing arrayed corner cubes around a light source.

Other examples of the structures made of highly reflective materials encompass optical structures such as a light guide and an optical resonator each made of an optical medium.

(4) Light guide (Waveguide): Most of light guides (waveguides) typified by optical fibers and made of a transparent optical medium are arranged such that a core having a high refractive index is provided at a center, and a clad having a low refractive index is provided around the core. Light from the core is totally internally reflected when coming into contact with the clad. The light is confined in the core without being radiated to an outside of the core, and travels in the core. Such a guided mode is employed for transmission. Meanwhile, light having (i) a wide intersection angle when coming into contact with the clad (having a narrow entrance angle) and (ii) a wide spread angle which prevents the light from being totally internally reflected leaks to the outside of the core. This results in a radiation mode having a great transmission loss. Further, when we use light guides of this type for transmission with high optical power, the light guides need to have a great aperture. This causes problems of a heavy weight and a light loss in the core.

Another example of the optical structures is a hollow light guide which is hollow and has an outer surface on which an optical medium is provided. The hollow light guide is light even in case where the hollow light guide has a great aperture. The hollow light guide is suitable for transmission with high optical power since the hollow light guide has a hollow core. The hollow light guide is further devised by, for example, employing a guided mode in which no light is radiated to an outside of the hollow core, or providing the outer surface with a metal film so as to reflect light.

In the above cases, there are two modes: (i) the guided mode in which optical transmission is carried out with less loss, and (ii) the radiation mode in which light is radiated to an outside, so that a transmission loss is increased. Normally, only the guided mode is employed. Note that, in a case where the light guide is connected with an external apparatus or another transmission line, perfect mode matching is difficult. Therefore, the radiation mode partially exists and causes a coupling loss. A hollow light guide with a metal film can suppress the radiation mode but a problem of an absorption loss in the metal film is caused.

The guided mode commonly corresponds to light beams which have a narrow spread angle and do not travel at a wide angle with respect to a waveguide axis direction. Meanwhile, the radiation mode corresponds to light beams which have a wide spread angle and have a component that travels at a wide angle with respect to the waveguide axis direction. In the radiation mode, the light beams leak to an outside without being subjected to total internal reflection. Total internal reflection requires an entrance angle wider than a critical angle determined depending on a refractive index difference. Therefore, from the viewpoint of light rays, a mode, which corresponds to light that travels in a zigzag manner principally in an axis direction and slightly in a radial direction, is the guided mode. A mode, which corresponds to light that greatly meanders more in the radial direction than in the axis direction and has great difficulty in traveling forward, is the radiation mode.

A hollow light guide that has recently gained attention is exemplified by a photonic crystal fiber. The photonic crystal fiber has many advantages, whereas the photonic crystal fiber has disadvantages of a complicated structure and limitation on an operating wavelength region due to a periodic structure substantially equivalent to a wavelength.

In view of the circumstances, for example, Patent Literature 2 discloses a hollow light guide as a hollow light guide that does not have a complicated structure unlike the photonic crystal fiber. The hollow light guide disclosed in Patent Literature 2 guides light by causing its wall to totally internally reflect the light.

According to the hollow light guide disclosed in Patent Literature 2, at least one triangular ridge is provided on an outer surface of a square tube in an axial direction of the square tube, so as to guide light by causing a wall of the hollow light guide to totally internally reflect the light. It is therefore necessary to transmit light beams having an angle falling within an angle determined depending on a refractive index. The hollow light guide disclosed in Patent Literature 2 serves as a transmission line for transmitting light while preventing light beams from spreading.

That is, the hollow waveguide disclosed in Patent Literature 2 has the so-called radiation mode in which light beams having an angle beyond the angle determined depending on the refractive index leak to an outside of the hollow waveguide in a case where the light beams are transmitted (see, for example, FIG. 42). It goes without saying that unnecessary light enters the hollow waveguide also from the outside of the hollow waveguide.

(5) Optical resonator: A typical example of a conventional optical resonator is Fabry-Perot resonator in which two mirrors face each other. The Fabry-Perot resonator confines only light along an optical axis, and disperses light other than the light along the optical axis. A semiconductor laser employs a waveguide structure, in which the radiation mode exists. Recently, a high Q resonator using a photonic crystal has been researched. Note, however, that, since a periodic structure which is substantially equivalent to a wavelength is employed in a photonic crystal as described above, the high Q resonator is limited in usable wavelength region. Depending on a case, the high Q resonator is also limited in direction in which light is emitted in the high Q resonator.

CITATION LIST

Patent Literatures

Patent Literature 1
Japanese Patent Application Publication Tokukai No. 2008-89977 A (Publication Date: Apr. 17, 2008)
Patent Literature 2
Specification of U.S. Pat. No. 4,260,220 (Publication Date: Apr. 7, 1981)

SUMMARY OF INVENTION

Technical Problem

However, the conventional techniques have the following problems.

(1) High Q optical resonator using dielectric sphere: Light having all angles cannot be totally internally reflected. Light traveling to a spherical surface at an angle close to a right angle is not totally internally reflected, and the light exits to an outside. Light enters the sphere from an outside of the sphere, and light is transmitted by the sphere. Since the high Q resonator is not hollow, it is impossible to provide an experimental space in the high Q resonator. Further, a large-sized high Q resonator is heavy.

(2) Mirror ball: A mirror ball requires many common reflecting mirrors to be attached to its spherical surface (polyhedron). It is almost impossible to cover the entire spherical surface with mirrors. An inside of the sphere has no function.

(3) Natural or artificial jewel: A natural or artificial jewel is extremely expensive. Further, it is difficult to cause an inside of the natural or artificial jewel to be hollow, and the natural or artificial jewel is heavy. In addition, all light beams cannot be totally internally reflected.

Further, the optical structures such as a light guide and an optical resonator have the following problems.

(4) Light guide (waveguide): According to Example of Patent Literature 2, an acrylic plate having a low refractive index (n≈1.49) is used as an optical medium. Therefore, the light guide is highly likely to be in the radiation mode, and light may easily enter the light guide from an outside. Patent Literature 2 basically relates to a waveguide having the radiation mode. It is impossible to apply the waveguide, as it is, to a branch structure, a bend structure, and a reflective structure each of which is significant also in a waveguide. Patent Literature 2 describes no such application. It goes without saying that the light guide which has no reflective section does not function as an optical resonator for resonating light therein, and Patent Literature 2 describes no resonator.

(5) Optical resonator: A conventional open-type optical resonator which is simply arranged has a light confinement effect merely in a specific direction. Even such an optical resonator having a complicated structure has many problems such that (I) the optical resonator is limited in (i) wavelength region in which the optical resonator operates as a resonator or (ii) directivity and (II) a large experimental space cannot be secured in the optical resonator.

The present invention has been made in view of the problems, and a first object of the present invention is to provide, as a structure which causes an inside thereof to be hollow and can be easily lighter and larger, a structure which totally internally reflects light having any entrance angle and prevents the light from exiting to an outside thereof from the inside, or a structure which allows light having entered the structure from the outside at any entrance angle to be totally internally reflected and prevents the light from entering the inside of the structure.

A second object of the present invention is to provide a structure having an optical property that cannot be attained by, for example, a conventional mirror ball, a conventional lighting apparatus, and a conventional jewel.

A third object of the present invention causes the first object to be more specific, so as to specifically give a structural shape and a refractive index of an optical material. The third object of the present invention is to provide an optical structure which has a non-radiation mode and has a simple structure and in which limitation on an operating wavelength region is removed, light confined in any direction is not radiated to an outside of the optical structure or no light enters the optical structure from the outside of the optical structure, and a large space for use of light can be prepared.

A fourth object of the present invention is to provide an optical structure which has a non-radiation mode and is widely applicable also to, for example, a bend and a branch each of which is significant in a light guide.

Solution to Problem

In order to attain the objects, an optical structure of the present invention has a structure which is a polyhedron or a sphere that is surrounded by a reflective material so that an inside of the optical structure is a hollow part, the reflective material being made of an optical medium which transmits light, and having (i) a first plane which is a surface on which inclined planes are aligned with no gap therebetween and (ii) a second plane which is opposite to the first plane and is a flat surface or an approximately planar and gently curved surface, and the first plane having a shape and a refractive index such that at any time, light having entered the first plane or the second plane enters, at an entrance angle larger than a critical angle of total internal reflection, a corresponding opposite one of the first plane and the second plane (i) directly from an inside of the reflective material or (ii) from the inside of the reflective material after having experienced repeated internal reflection.

According to the arrangement, when light having entered the second plane of the reflective material is transmitted through the second plane of the reflective material and then exits to the inside of the reflective material, an exit angle at which the light from the second plane exits to the inside of the reflective material is limited by a refractive index of the reflective material. When the light limited in exit angle at which the light exits to the inside of the reflective material reaches the first plane, the light is totally internally reflected since the first plane has a shape such that the light enters the first plane at an entrance angle larger than a critical angle of total internal reflection. After the total internal reflection, in a case where the light enters another inclined plane of the first plane or in a case where the light enters the first plane after being repeatedly reflected in the structure, e.g., returning to the first plane after returning to the second plane, the first plane has a shape such that the light enters the first plane at an entrance angle larger than a critical angle of total internal reflection. Therefore, total internal reflection occurs in the first plane at any time. That is, the first plane has a shape such that the light having entered the first plane from the second plane is totally internally reflected in the first plane without fail even if the light follows any path in the reflective material, and the light is absolutely prevented from being transmitted through the first plane. In contrast, from the viewpoint of light reciprocity, it is a matter of course that the light having entered the second plane from the first plane of the reflective material is totally internally reflected in the second plane at any time even if the light follows any path in the reflective material, and the light is prevented from being transmitted through the second plane.

As described earlier, light having entered one of planes of a reflective material cannot pass through the other of the planes and returns to the entrance surface side. Therefore, the present structure which is surrounded by the reflective material so that an inside of the structure is a hollow part can have an extremely high optical Q value which prevents a leakage of light.

Another optical structure of the present invention has a structure which is a polyhedron or a sphere that is surrounded by a reflective material so that an inside of the optical structure is a hollow part, the reflective material being made of an optical medium which transmits light, and having (i) a first plane which is a surface on which inclined planes are aligned with no gap therebetween and (ii) a second plane which is opposite to the first plane and is a flat surface or an approximately planar and gently curved surface, and the first plane having a shape and a refractive index such that the first plane totally internally reflects light which enters the second plane at an entrance angle smaller than a given entrance angle and the first plane transmits a part of light which enters the second plane at an angle larger than the given entrance angle.

According to the arrangement, light having entered a reflective material from one of planes of the reflective material is totally internally reflected or allowed to be partially transmitted depending on its entrance angle. Further, transmitted light, which passes through a flat surface serving as the second plane and an inclined plane of the first plane, is refracted by a prism effect. This make it possible to obtain an unexpected optical characteristic such that eyes will see an edge when the eyes try to see a right front direction, or eyes will see the right front direction when the eyes try to see the edge.

According to the structure, the first plane of the reflective material can be a surface on which triangular ridges or multiangular pyramids are aligned with no gap therebetween.

Further, in order to attain the objects, an inventor of the present invention focused on a principal axis plane and a 45 inclined plane, and found out an optical structure which can have an ideal structure as an optical waveguide or an optical resonator. The principal axis plane is a flat surface whose normal line is in parallel with principal axes x, y, and z of a rectangular coordinate system. The 45 inclined plane is a flat surface whose normal line is orthogonal to one of the principal axes is located at an angle of 45° with respect to each of the other two of the principal axes.

Namely, due to peculiarity of the principal axis plane and the 45 inclined plane, even if a light beam having entered, through the principal axis plane, an optical medium having a refractive index n is repeatedly reflected by the principal axis plane and the 45 inclined plane, three components (an x component, a y component, and a z component) of a light beam vector, which are exchanged with each other and whose positive and negative signs are replaced with each other, are not changed to components other than these three components. There are 48 (6×8) combinations in total in consideration of both (i) 6 (3 !) combinations for dividing three kinds into three without causing the three kinds to overlap each other and (ii) 8 (cube of 2) combinations in which each of the three kinds can have positive and negative signs. Therefore, light beam having entered, through the principal axis plane, an optical medium having a refractive index n is repeatedly internally reflected by the principal axis plane and the 45 inclined plane is limited to any one of these 48 kinds of light beams. As described later, the inventor of the present invention first mathematically proved that each of these 48 kinds of light beams is totally internally reflected in all 45 inclined planes in a case where an optical medium has a refractive index n of more than $\sqrt{(4+2\sqrt{2})}$, and the present invention is theoretically based on this proof. The invention based on a basic physical principle which is unique to the inventor of the present invention is unconventional and novel, not to mention.

As a result, these 48 kinds of light beams, i.e., light beams having entered, through the principal axis plane, the optical medium having a refractive index n are totally internally reflected in the 45 inclined plane even if the light beams are repeatedly subjected to any internal reflection, so that the light beams cannot exit from the 45 inclined plane. Further, from the viewpoint of light reciprocity, light having entered the 45 inclined plane is totally internally reflected in the principal axis plane without fail even if the light follows any path, so that the light cannot exit from the principal axis plane (supplementary explanation of reciprocity: If there is a light beam path through which light having entered the optical medium from the 45 inclined plane can exit from the principal axis plane and such a path is traced back, it follows that the light having entered the principal axis plane can pass through the 45 inclined plane. This results in inconsistency).

This causes a hollow pipe having a structure in which a first plane is a principal axis plane and a second plane opposite to the first plane is a 45 inclined plane (described earlier) to be a transmission line having no radiation mode. The hollow which is closed serves as a perfectly sealed optical resonator which prevents a light beam from exiting from an inside to an outside or prevents the light beam from entering the inside from the outside.

Accordingly, as an optical structure which can have an ideal structure as an optical waveguide or an optical resonator, an optical structure of the present invention has at least one hollow part which is provided in an optical medium that is light transmissive, the optical medium having a refractive index n of more than $\sqrt{(4+2\sqrt{2})}$, the optical medium being formed by a first plane and a second plane, the first plane overlapping no second plane, and being formed by combining a plurality of 45 inclined planes each of which is a flat surface whose normal line is orthogonal to one of principal axes x, y, and z of a rectangular coordinate system and is located at an angle of 45° with respect to each of the other two of the principal axes, the second plane being formed by combining a plurality of principal axis planes each of which is a flat surface whose normal line is in parallel with the principal axes x, y, and z of the rectangular coordinate system, and the at least one hollow part being surrounded by one of the first plane and the second plane.

According to the arrangement, in a case where the second plane surrounds the at least one hollow part, light beams from the at least one hollow part are partially reflected or partially transmitted in the second plane. However, as described earlier, all the light beams are reflected in the first plane and then finally returns to the at least one hollow part regardless of how the light beams are repeatedly reflected in the first plane and the second plane. Further, in a case where the first plane surrounds the at least one hollow part, light having transmitted from the at least one hollow part to the optical medium is totally internally reflected in the second plane without fail. Therefore, no light beam leaks to an outside from the second plane, and the light finally returns to the at least one hollow part even if the light is repeatedly subjected to internal reflection. Same applies to light having entered the structure from an outside. After having passed through the optical medium, such light is totally internally reflected in the first or second plane surrounding the at least one hollow part. This allows no light from the outside to enter the at least one hollow part.

Accordingly, the optical structure as arranged above allows obtainment of (i) a light guide which has no radiation mode and (ii) a resonator which achieves perfect omnidirectional total internal reflection (a resonator having an infinite Q value without medium loss).

That is, the optical structure as arranged above yields an effect of providing (i) an optical structure which has a non-radiation mode and has a simple structure and in which limitation on an operating wavelength region is removed, light confined in any direction is not radiated to an outside of the optical structure or no light enters the optical structure from the outside of the optical structure, and a large space for use of light can be prepared and (ii) an optical structure which has a non-radiation mode and is widely applicable also to, for example, a bend and a branch each of which is significant in a light guide.

In a case where the optical structure as arranged above is applied to an optical waveguide which has a light guide for guiding light, even a light beam which has a wide spread angle and has a component such that a light traveling direction forms a great angle with respect to an optical waveguide axial direction is totally internally reflected in the at least one hollow part or in the optical medium. This prevents light from leaking to the outside of the optical structure. Therefore, it is possible to make an optical waveguide having no radiation mode.

In a case where the optical structure as arranged above is applied to an optical resonator which has a resonating section for resonating light, not only light traveling along an optical axis but also light other than that light can be confined in the at least one hollow part. That is, according to the optical structure as arranged above, light in any wavelength region and in any direction is totally internally reflected. Therefore, it is possible to easily make an optical resonator which has a simple arrangement and has an extremely high Q value.

The optical structure may be arranged such that: the optical medium is made of an optical plate; and in a case where an outer surface of the optical plate is the first plane, an inner surface of the optical plate is the second plane, and in a case where the outer surface of the optical plate is the second plane, the inner surface of the optical plate is the first plane.

The optical structure may be arranged such that a plurality of the at least one hollow part may be provided in the optical medium.

This allows the optical structure to be a combined resonator or a combined waveguide in which light beams can be exchanged among a plurality of the at least one hollow part via the optical medium, and a large-aperture or large-space hollow part can be made while the entire optical structure has a constant strength. Further, the optical structure can also have a combined function in a case where functions are shared by the respective plurality of the at least one hollow part (e.g., a light source and a measurement sample, a light source and an amplifying section, and a modulating section).

The optical medium may be arranged to include at least one optical structure as arranged above provided in the at least one hollow part of the optical medium via a gap. Light cannot exit, from an inner hollow part included in the at least one optical structure thus provided, to an outer surface of the at least one optical structure, i.e., the at least one hollow part in which the at least one optical structure is provided. Further, since no light beam can exit from this at least one hollow part to an outside, light is doubly interrupted by the inner hollow part. According to this, a resonator having a higher Q value can be made. In a case where the optical medium includes a plurality of the at least one optical structure as arranged above provided in the at least one hollow part of the optical medium via a gap, hollow parts included in the plurality of the at least one optical structure are prevented from being combined.

The optical structure may be arranged to have a multilayer structure as below.

Namely, the optical structure is arranged such that, in a case where the outermost optical structure is the first optical structure, the second optical structure is provided in a hollow part of the first optical structure, the third optical structure is provided in a hollow part of the second optical structure, . . . , and the (k+1)th optical structure is provided in a hollow part of the kth (k is an integer more than 1).

The optical structure may be arranged such that a region of 45 inclined planes is provided in a part of an outer surface of the optical medium in a case where the outer surface is the second plane formed of the plurality of principal axis planes, and a region of principal axis planes is provided in the part of the outer surface of the optical medium in a case where the outer surface is the first plane formed of the plurality of 45 inclined planes.

According to the arrangement, the region provided in a part of the optical medium functions as a light input/output section.

That is, in a case where the outer surface of the optical medium is formed of the plurality of principal axis planes and an inner surface of the optical medium is formed of the plurality of 45 inclined planes, light from the hollow part surrounded by the plurality of 45 inclined planes is totally internally reflected, and thus the light cannot exit to an outside from the outer surface formed of the plurality of principal axis planes. However, in a case where a part of the outer surface is formed of 45 inclined planes, the light can exit therefrom. On the contrary, it goes without saying that light can enter the hollow part via this part. Assume that the outer surface is formed of the plurality of 45 inclined planes and the inner surface is formed of the plurality of principal axis planes. In this case, if a part of the outer surface is formed of principal axis planes, this part serves as an inlet/outlet to/from the hollow part which inlet/outlet is surrounded by the principal axis planes.

No light leaks from a region other than the region of the light input/output section.

Assume here that the optical structure as arranged above is used as an optical resonator. Though a Q value of the optical resonator is reduced to some extent since the optical resonator has an outlet of light, no radiation loss occurs in the other part of the optical resonator. This allows the optical resonator to be an ideal optical resonator.

In order to obtain a high Q value, it is only necessary that the light input/output section be small in size. In a case where the optical structure as arranged above is used for, for example, a laser oscillator, it is only necessary to adjust a size of the region of the light input/output section so as to achieve optimum coupling.

Normally, the optical structure as arranged above is arranged such that light in the hollow part is totally internally reflected in the outer surface and does not exit to the outside. However, strictly, an evanescent wave leaks to the outside from the optical medium even if the light is totally internally reflected. No radiation loss occurs since the evanescent wave thus leaking is not radiated to the outside. However, unless the optical structure is suspended, the optical structure is in contact with another substance. This causes the evanescent wave to enter the another substance via a part of the contact and to be absorbed or propagated in the another substance, so that radiation loss occurs.

In view of the above, in order to prevent a leakage of the evanescent wave from the optical medium to the another substance, it is preferable to arrange the optical structure as below.

Namely, the optical structure is preferably arranged such that: in a case where the optical medium has a refractive index n of more than $\Delta \cdot \sqrt{(4+2\sqrt{2})}$ ($\Delta \geq 1$), a layer is provided on an outer circumferential surface of the optical medium, the layer being made of an optical material having a refractive index of $\Delta$.

In a case where the layer made of an optical material having a refractive index of $\Delta$ has a thickness which is enough to sufficiently decrease an evanescent wave, light can be prevented from being lost and scattered even if the another substance is in contact with an outside of the layer. Further, it is possible to retain the optical structure not in a suspended state but in a stable state, or to provide the optical structure on a substrate.

The optical structure as arranged above may be arranged such that the hollow part is filled with the optical medium.

Namely, an optical structure of the present invention is preferably arranged such that: the optical medium has a refractive index n of more than $\Delta \cdot \sqrt{(4+2\sqrt{2})}$; the optical medium is formed by at least one first plane and at least one second plane; the at least one first plane overlaps no at least one second plane, and is formed by combining a plurality of 45 inclined planes each of which is a flat surface whose normal line is orthogonal to one of principal axes x, y, and z of a rectangular coordinate system and is located at an angle of 45° with respect to each of the other two of the principal axes; the at least one second plane is formed by combining a plurality of principal axis planes each of which is a flat surface whose normal line is in parallel with the principal axes x, y, and z of the rectangular coordinate system; and a space is filled with the optical medium having a refractive index of $\Delta$, the space being surrounded by one of the at least one first plane and the at least one second plane.

According to the arrangement, in a case where another optical structure is provided in the hollow part, it is possible to cause the optical medium having a refractive index of $\Delta$ and filling the hollow part to retain the another optical structure thus provided.

The optical structure may be arranged to include a light emitting device or a light emission controlling element embedded in a region filled with the optical medium having a refractive index of $\Delta$.

This allows the optical medium having a refractive index of $\Delta$ to stably retain the light emitting device or the light emission controlling element.

The optical structure may be arranged such that a plurality of the at least one first plane or the at least one second plane are provided on a line having any curvature radius.

In this case, a curved surface having an extremely large curvature radius is substantially a flat surface when locally seen. Accordingly, a non-radiation condition can be approximately obtained in a case where the curved surface is one of the principal axis planes and a structure constituted by the 45 inclined planes is formed on or under the curved surface by use of an optical medium having a refractive index of slightly more than $\sqrt{(4+2\sqrt{2})}$. According to this, a large-aperture light guide can be made.

Advantageous Effects of Invention

An optical structure of the present invention has a structure which is a polyhedron or a sphere that is surrounded by a reflective material so that an inside of the optical structure is a hollow part, the reflective material being made of an optical medium which transmits light, and having (i) a first plane which is a surface on which inclined planes are aligned with no gap therebetween and (ii) a second plane which is opposite to the first plane and is a flat surface or an approximately planar and gently curved surface, and the first plane having a shape and a refractive index such that at any time, light having entered the first plane or the second plane enters, at an entrance angle larger than a critical angle of total internal reflection, a corresponding opposite one of the first plane and the second plane (i) directly from an inside of the reflective material or (ii) from the inside of the reflective material after having experienced repeated internal reflection.

Therefore, light having entered one of planes of a reflective material cannot pass through the other of the planes and returns to the entrance surface side. Therefore, the present structure which is surrounded by the reflective material so that an inside of the structure is a hollow part can have an extremely high optical Q value which prevents a leakage of light, and can function as an optical experimental sphere or an optical experimental polyhedron, or a decorative lighting apparatus or an artificial jewel which brightly glitters while being hollow and light.

Another optical structure of the present invention has a structure which is a polyhedron or a sphere that is surrounded by a reflective material so that an inside of the optical structure is a hollow part, the reflective material being made of an optical medium which transmits light, and having (i) a first plane which is a surface on which inclined planes are aligned with no gap therebetween and (ii) a second plane which is opposite to the first plane and is a flat surface or an approximately planar and gently curved surface, and the first plane having a shape and a refractive index such that the first plane totally internally reflects light which enters the second plane at an entrance angle smaller than a given entrance angle and the first plane transmits a part of light which enters the second plane at an angle larger than the given entrance angle.

Therefore, light having entered a reflective material from one of planes of the reflective material is totally internally reflected or allowed to be partially transmitted depending on its entrance angle. Further, transmitted light, which passes through a flat surface serving as the second plane and an inclined plane of the first plane, is refracted by a prism effect. This make it possible to obtain an unexpected optical characteristic such that eyes will see an edge when the eyes try to see a right front direction, or eyes will see the right front direction when the eyes try to see the edge, and to cause the another optical structure in which a light source is provided to function as, for example, decorative lighting.

A more specific further optical structure of the present invention has at least one hollow part which is provided in an optical medium that is light transmissive, the optical medium having a refractive index n of more than $\sqrt{(4+2\sqrt{2})}$, the optical medium being formed by a first plane and a second plane, the first plane overlapping no second plane, and being formed by combining a plurality of 45 inclined planes each of which is a flat surface whose normal line is orthogonal to one of principal axes x, y, and z of a rectangular coordinate system and is located at an angle of 45° with respect to each of the other two of the principal axes, the second plane being formed by combining a plurality of principal axis planes each of which is a flat surface whose normal line is in parallel with the principal axes x, y, and z of the rectangular coordinate system, and the at least one hollow part being surrounded by one of the first plane and the second plane.

According to this, the optical structure as arranged above yields an effect of providing (i) an optical structure which has a non-radiation mode and has a simple structure and in which limitation on an operating wavelength region is removed, light confined in any direction is not radiated to an outside of the optical structure or no light enters the optical structure from the outside of the optical structure, and a large space for use of light can be prepared and (ii) an optical structure which has a non-radiation mode and is widely applicable also to, for example, a bend and a branch each of which is significant in a light guide.

Figure 5:
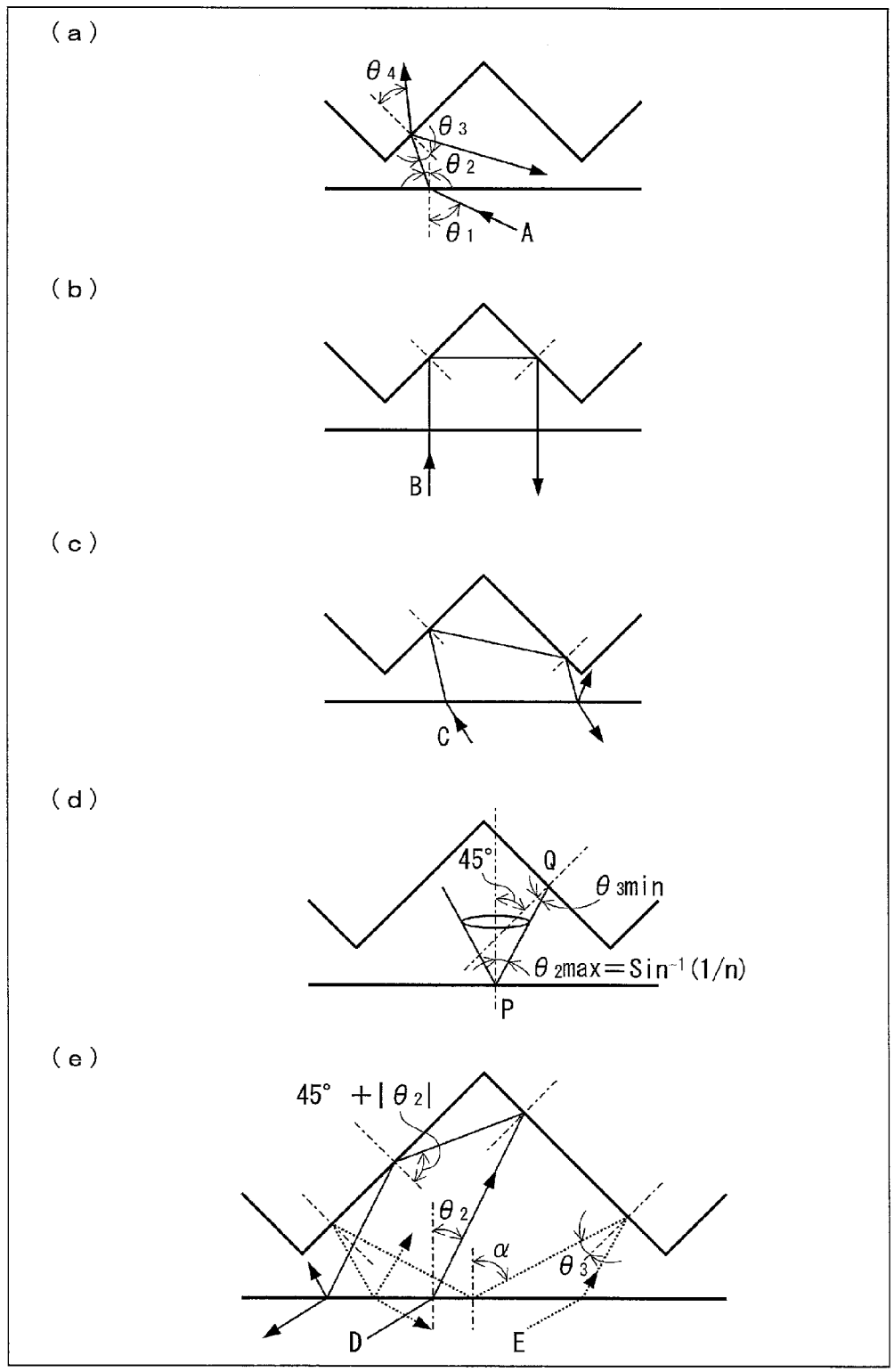
FIG. 5

(a) through (e) of FIG. 5 are cross-sectional views each of which takes, as an example, a reflective material having a right triangular ridge structure, so as to illustrate how total internal reflection occurs.

Figure 6:
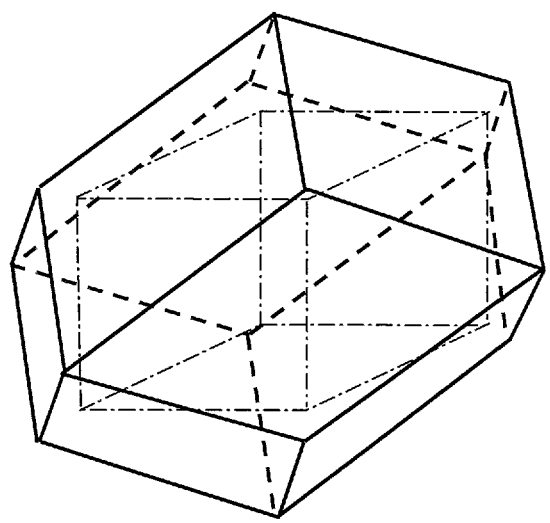
Figure 6:
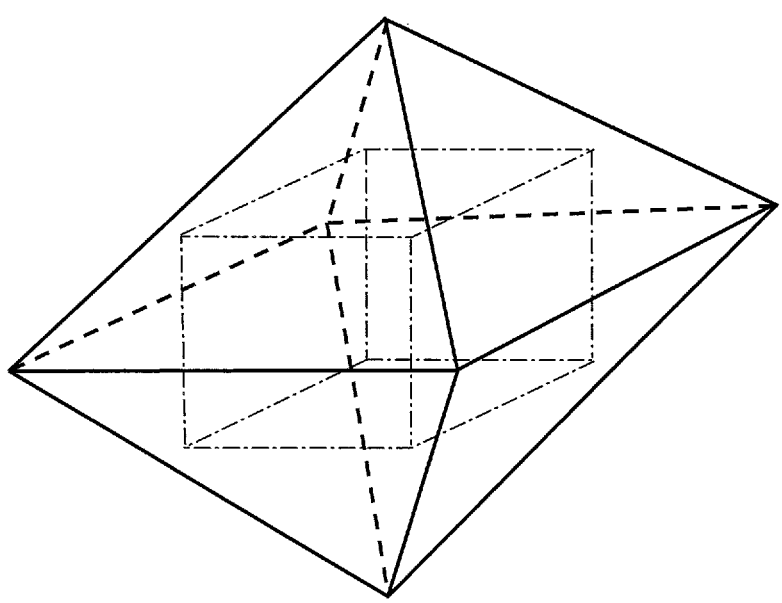

FIG. 6(a) is a perspective view illustrating a simple arrangement example of a structure in accordance with Embodiment 2.

FIG. 6(b) is a perspective view illustrating a simple arrangement example of a structure in accordance with Embodiment 2.

Figure 7:
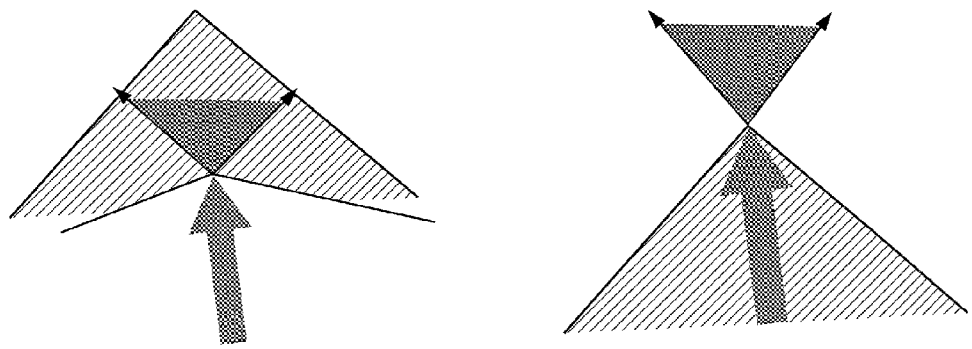

FIG. 7 is a view illustrating an edge effect on light having entered an edge part.

Figure 8:
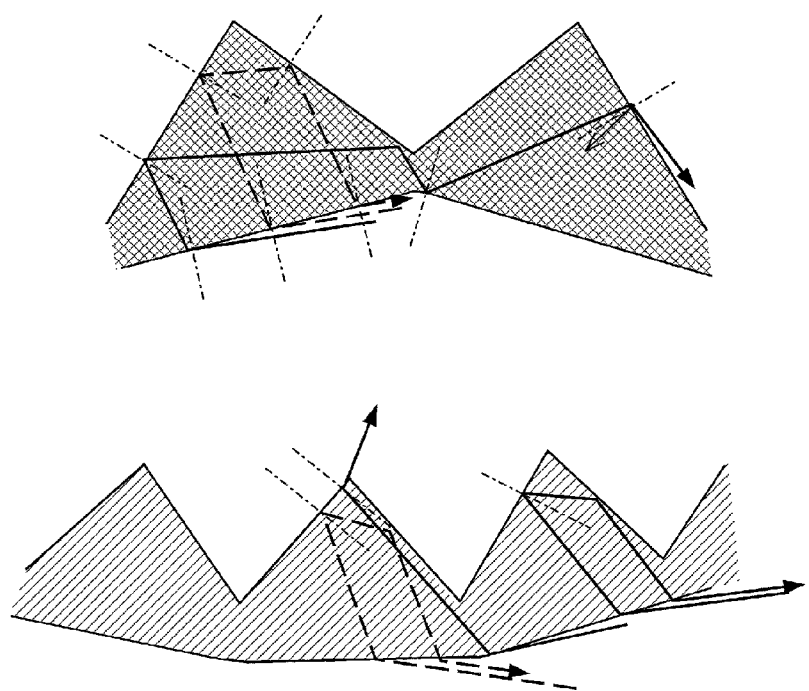

FIG. 8 is a view illustrating transmitted light caused by a bend in a reflective material having a bend structure and having a transmittance identical to a critical refractive index of a flat plate.

Figure 9:
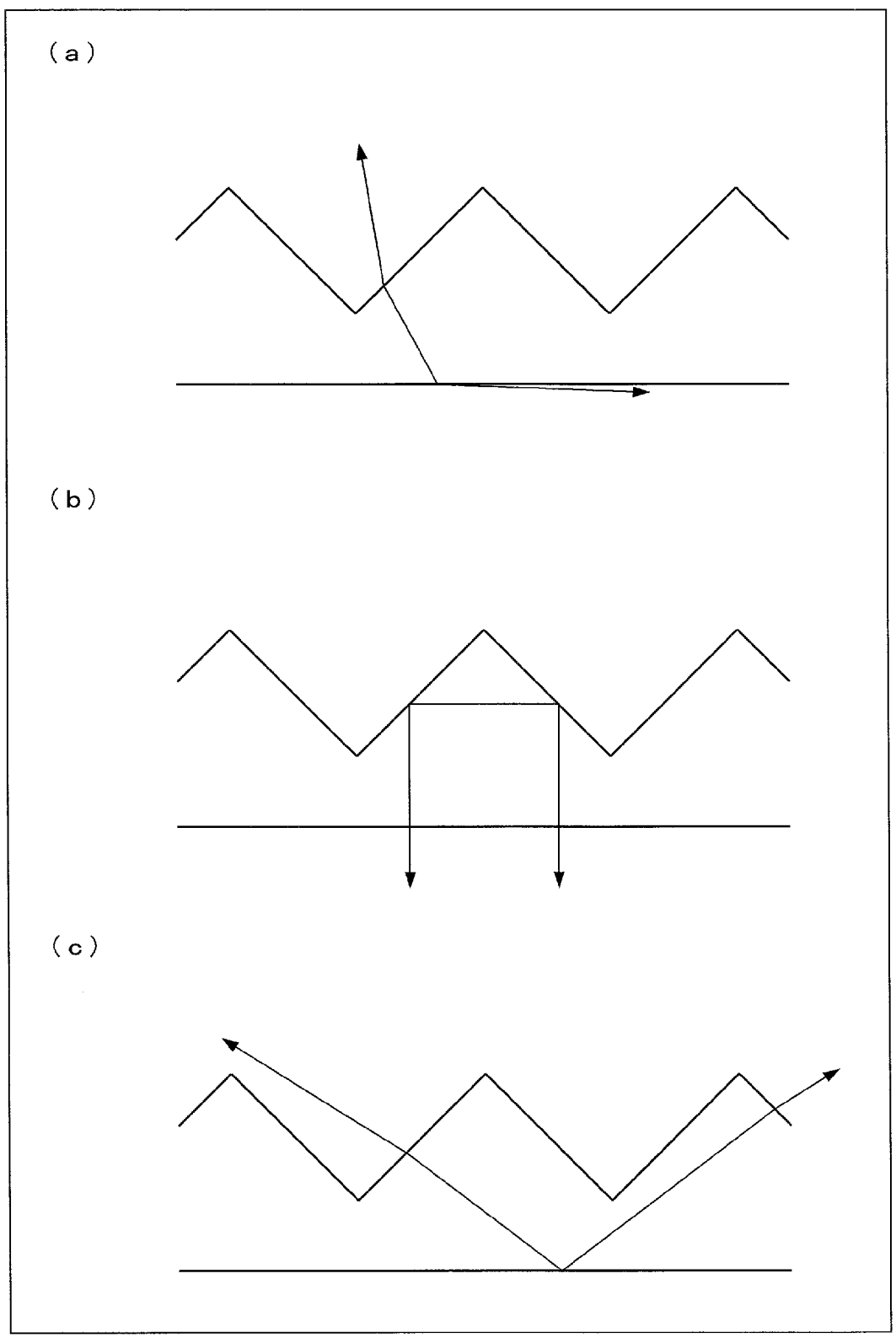

FIG. 9 has cross-sectional views each illustrating how light is reflected and transmitted in a reflective material used in a structure in accordance with Embodiment 3.

Figure 10:
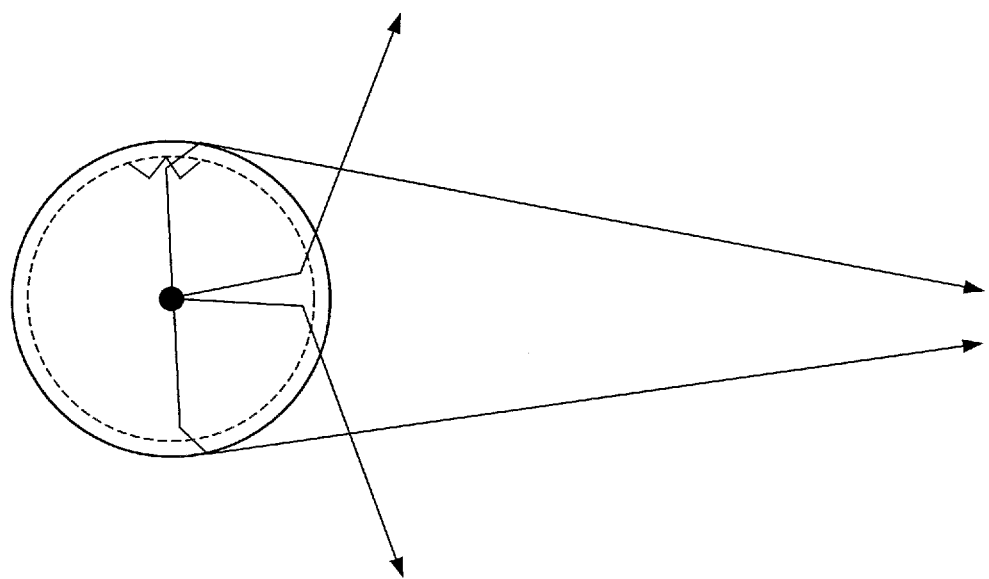
Figure 10:
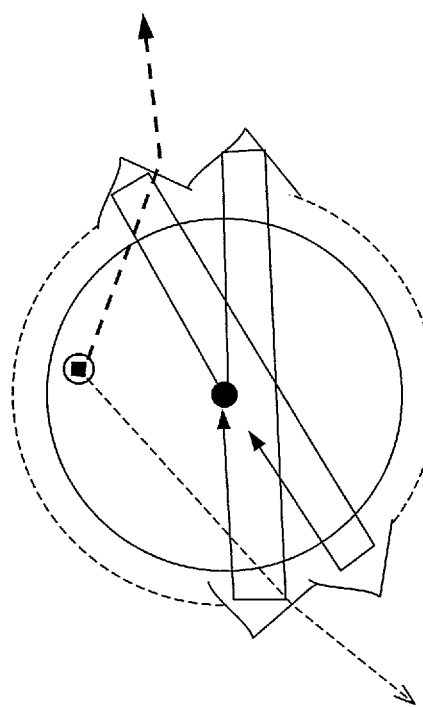

FIG. 10(a) is a view illustrating an example in which a structure in accordance with Embodiment 3 is applied to a decorative light bulb.

FIG. 10(b) is a view illustrating an example in which a structure in accordance with Embodiment 3 is applied to a decorative light bulb.

Figure 11:
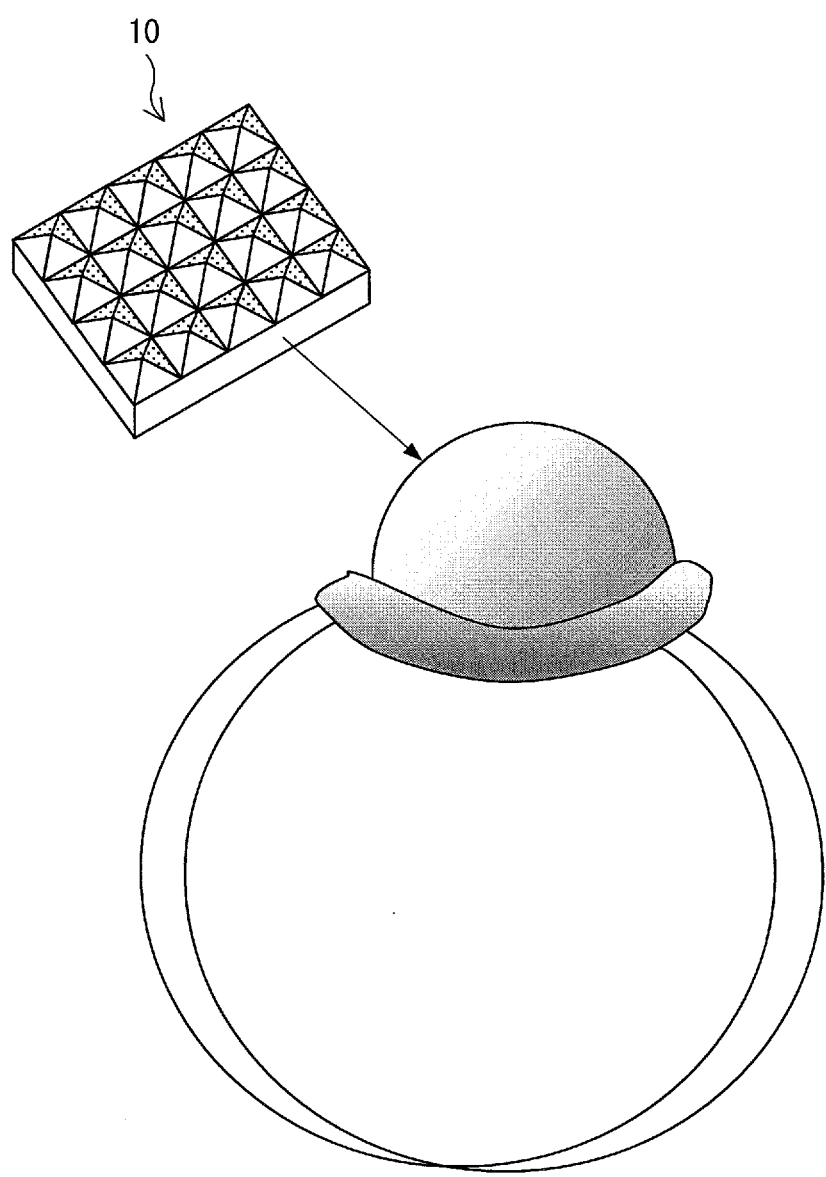

FIG. 11 is a view illustrating an example in which a structure in accordance with Embodiment 4 is applied to an accessory as an artificial jewel.

Figure 12:
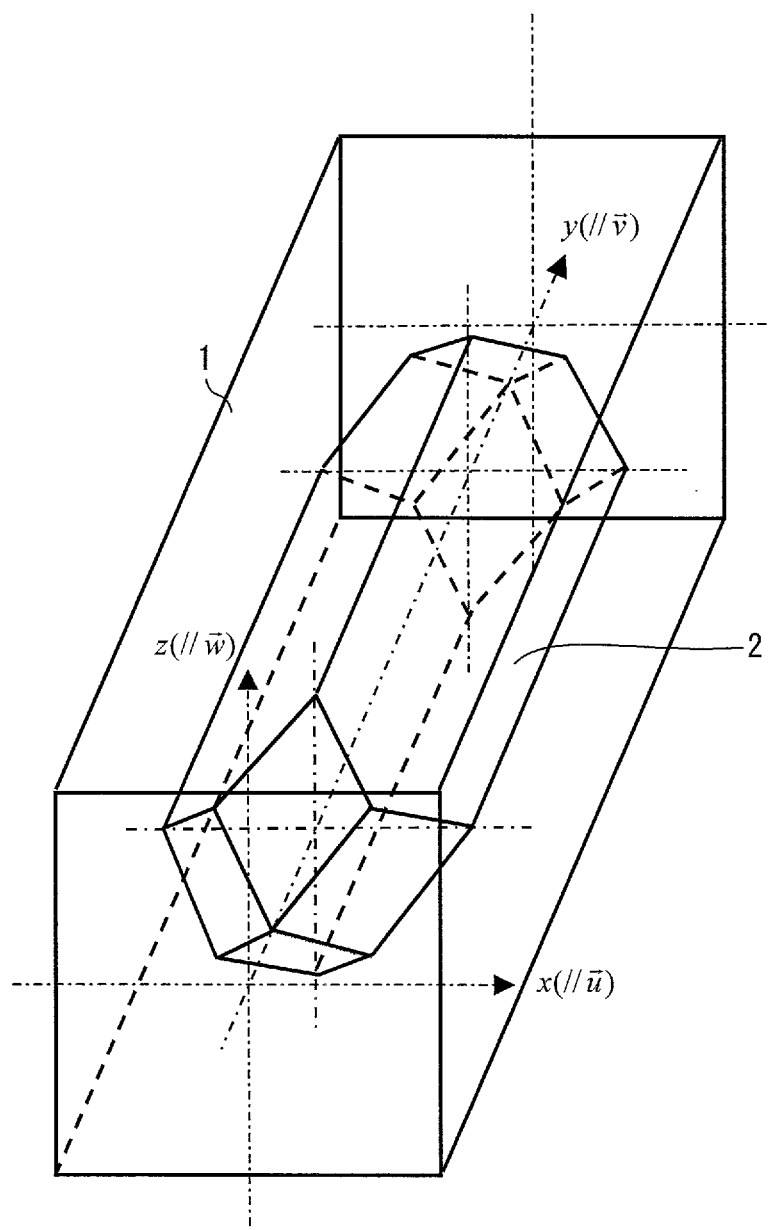

FIG. 12 is a perspective view schematically illustrating an optical structure showing a basic arrangement of the present invention.

Figure 13:
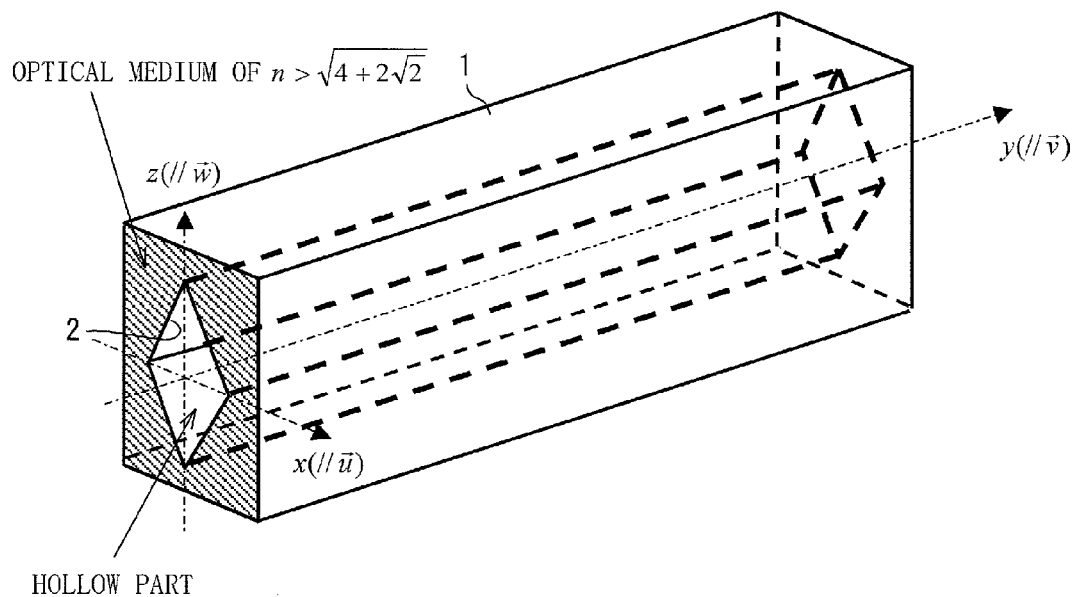

FIG. 13 is a perspective view schematically illustrating a hollow light guide in accordance with Embodiment 5 of the present invention.

Figure 14:
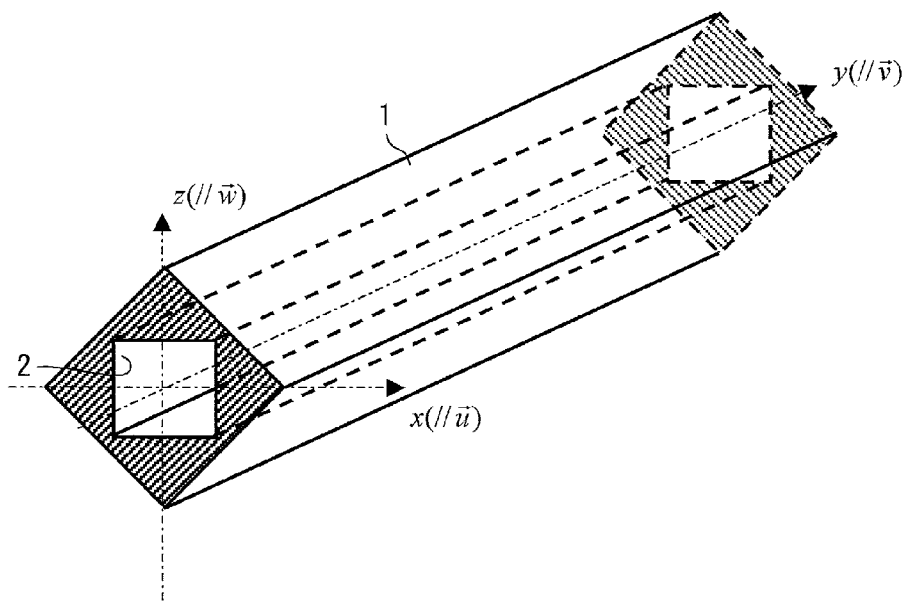

FIG. 14 is a perspective view schematically illustrating another hollow light guide in accordance with Embodiment 5 of the present invention.

Figure 15:
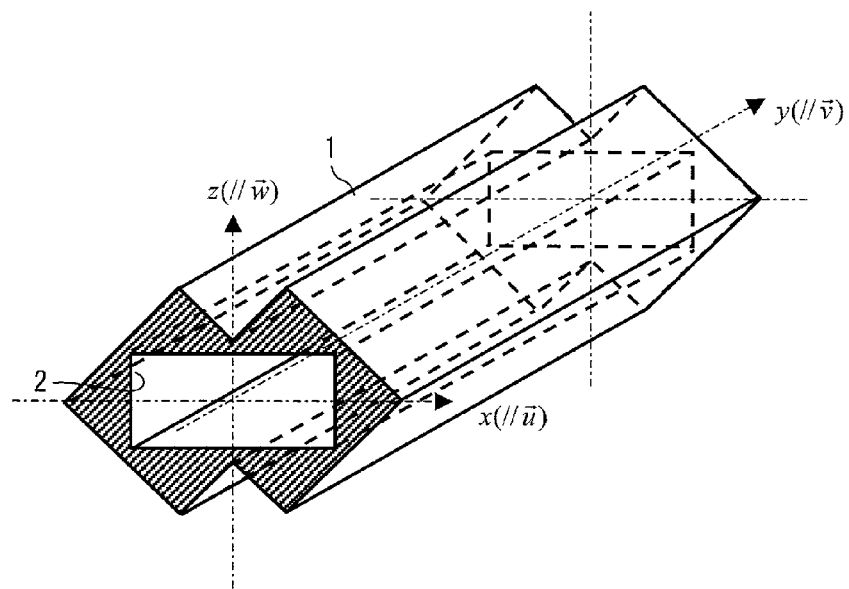

FIG. 15 is a perspective view schematically illustrating still another hollow light guide in accordance with Embodiment 5 of the present invention.

FIG. 16

Figure 16:
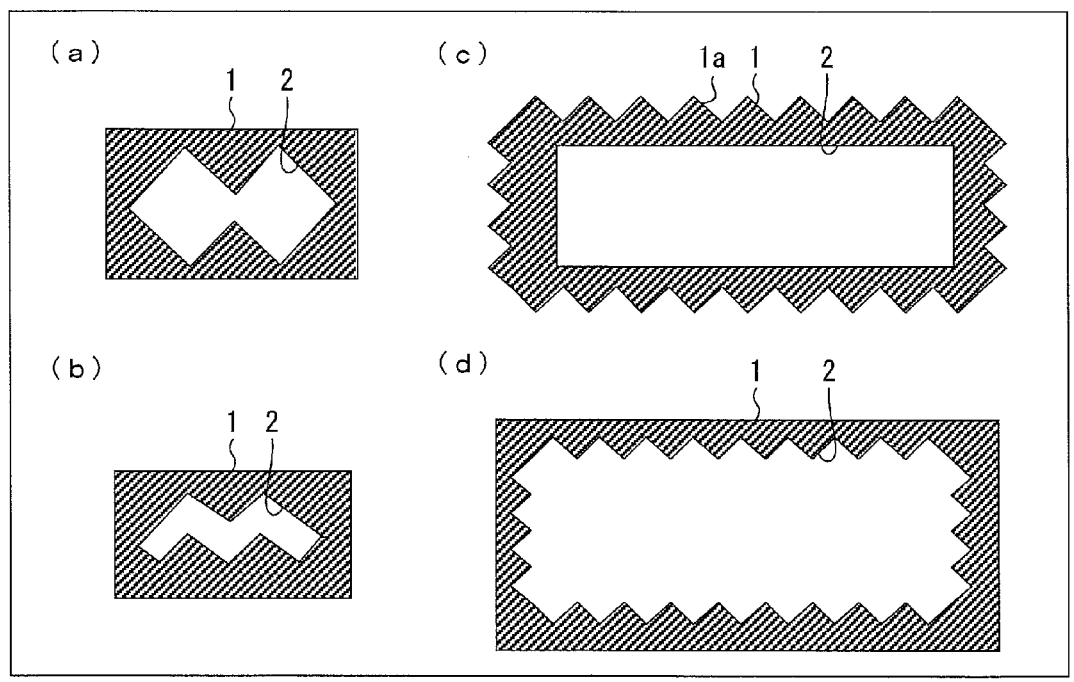

(a) through (d) of FIG. 16 are cross-sectional views each schematically illustrating still another hollow light guide in accordance with Embodiment 5 of the present invention.

Figure 17:
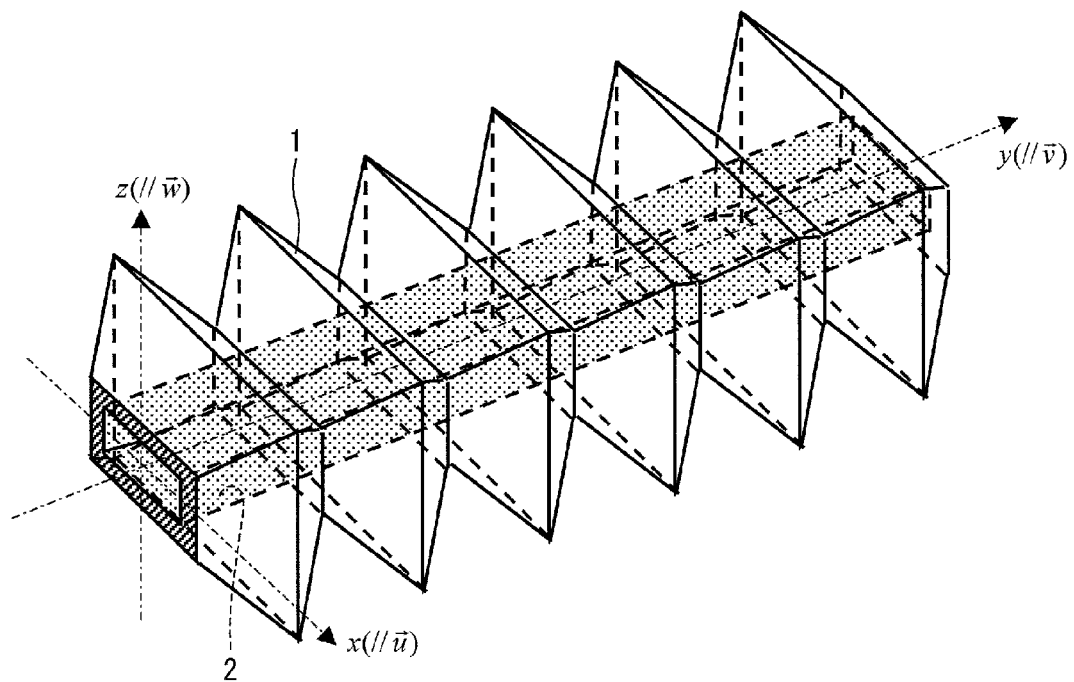

FIG. 17 is a perspective view schematically illustrating still another hollow light guide in accordance with Embodiment 5 of the present invention.

Figure 18:
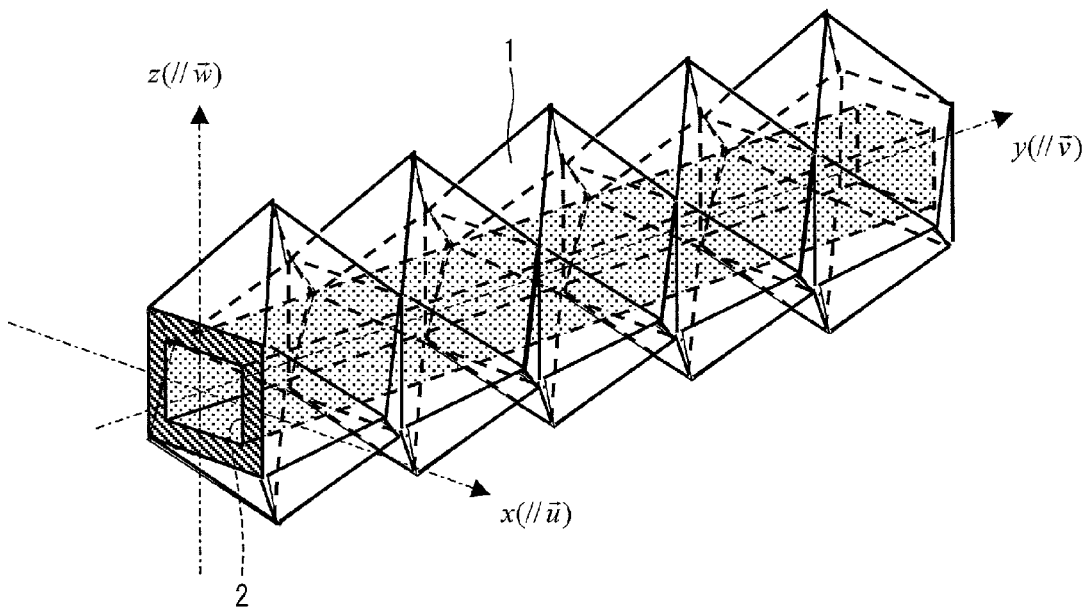

FIG. 18 is a perspective view schematically illustrating still another hollow light guide in accordance with Embodiment 5 of the present invention.

Figure 19:
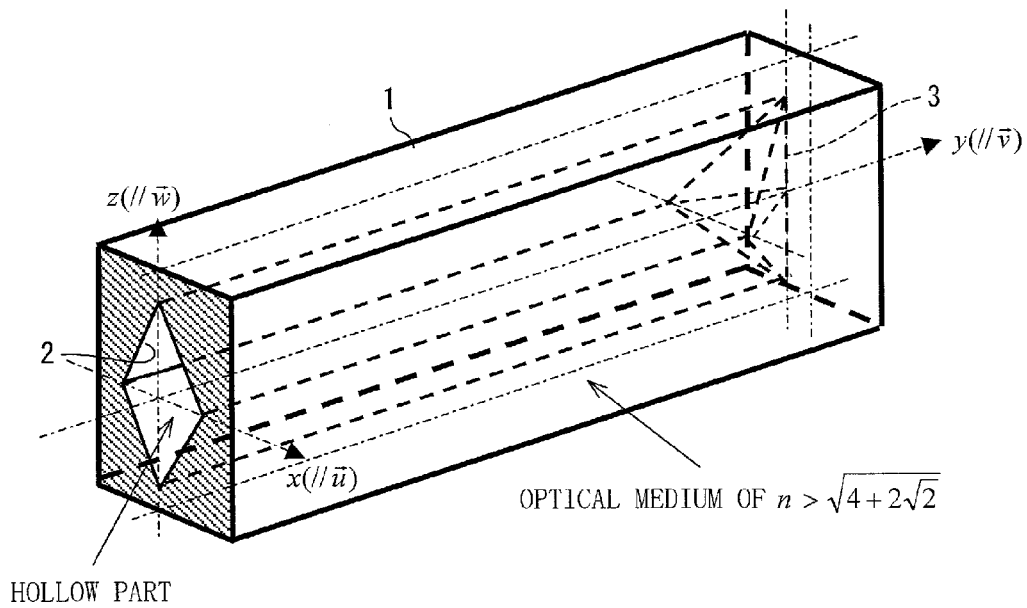

FIG. 19 is a perspective view schematically illustrating still another hollow light guide in accordance with Embodiment 5 of the present invention.

FIG. 20

Figure 20:
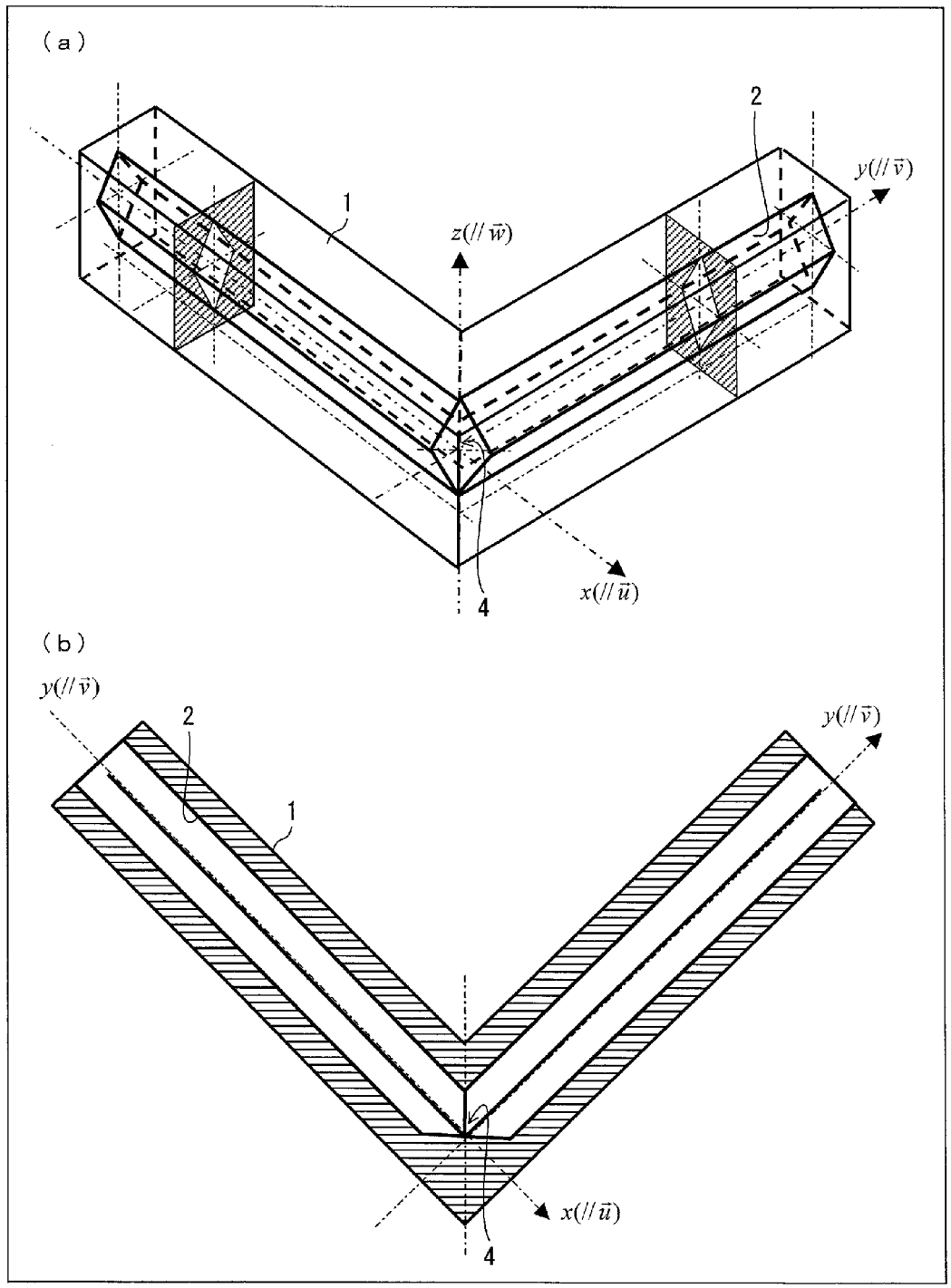

(a) of FIG. 20 is a perspective view schematically illustrating still another hollow light guide in accordance with Embodiment 5 of the present invention. (b) of FIG. 20 is a top cross-sectional view schematically illustrating the hollow light guide illustrated in (a) of FIG. 20.

FIG. 21

Figure 21:
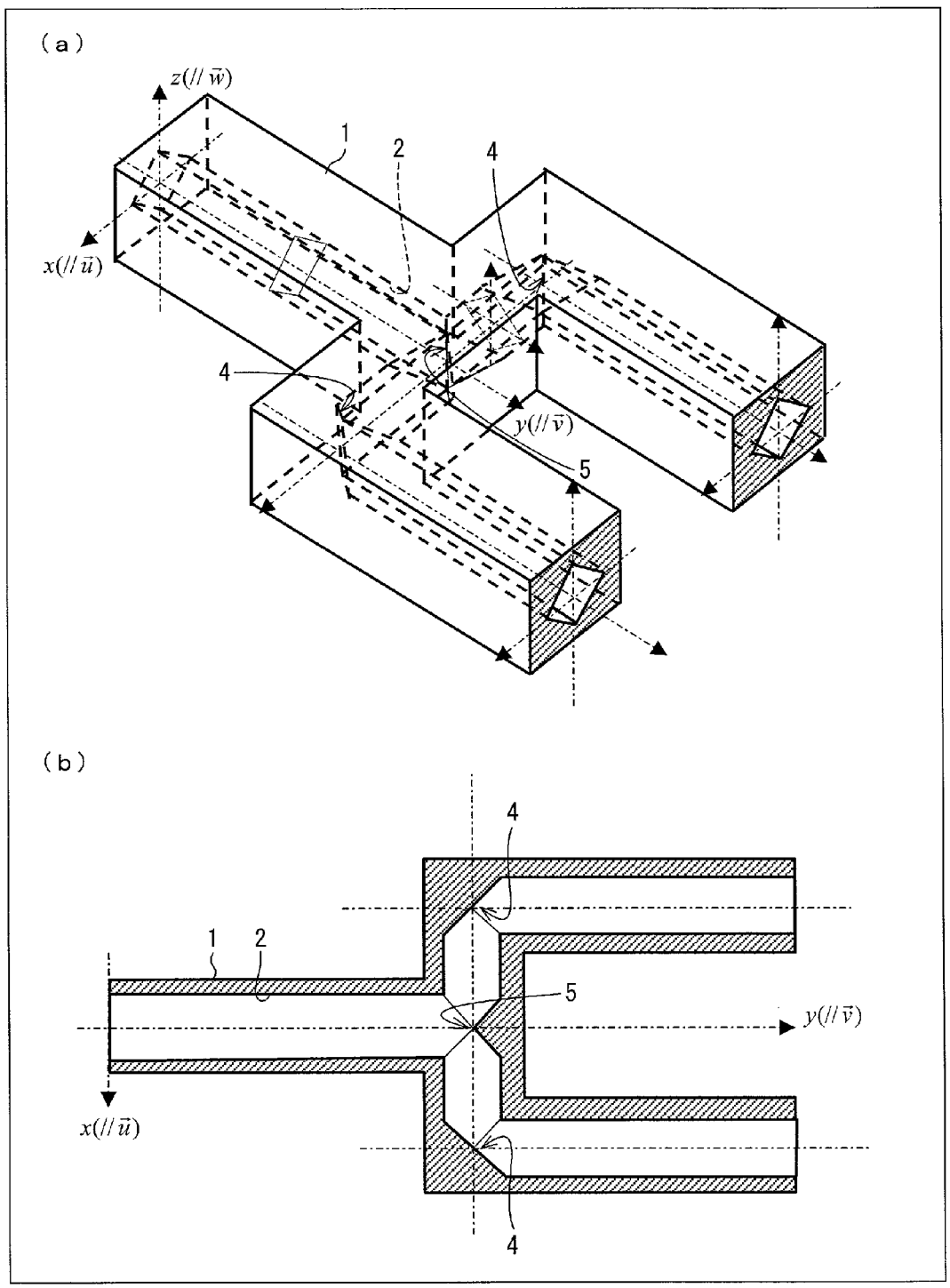

(a) of FIG. 21 is a perspective view schematically illustrating still another hollow light guide in accordance with Embodiment 5 of the present invention. (b) of FIG. 21 is a top cross-sectional view schematically illustrating the hollow light guide illustrated in (a) of FIG. 21.

Figure 22:
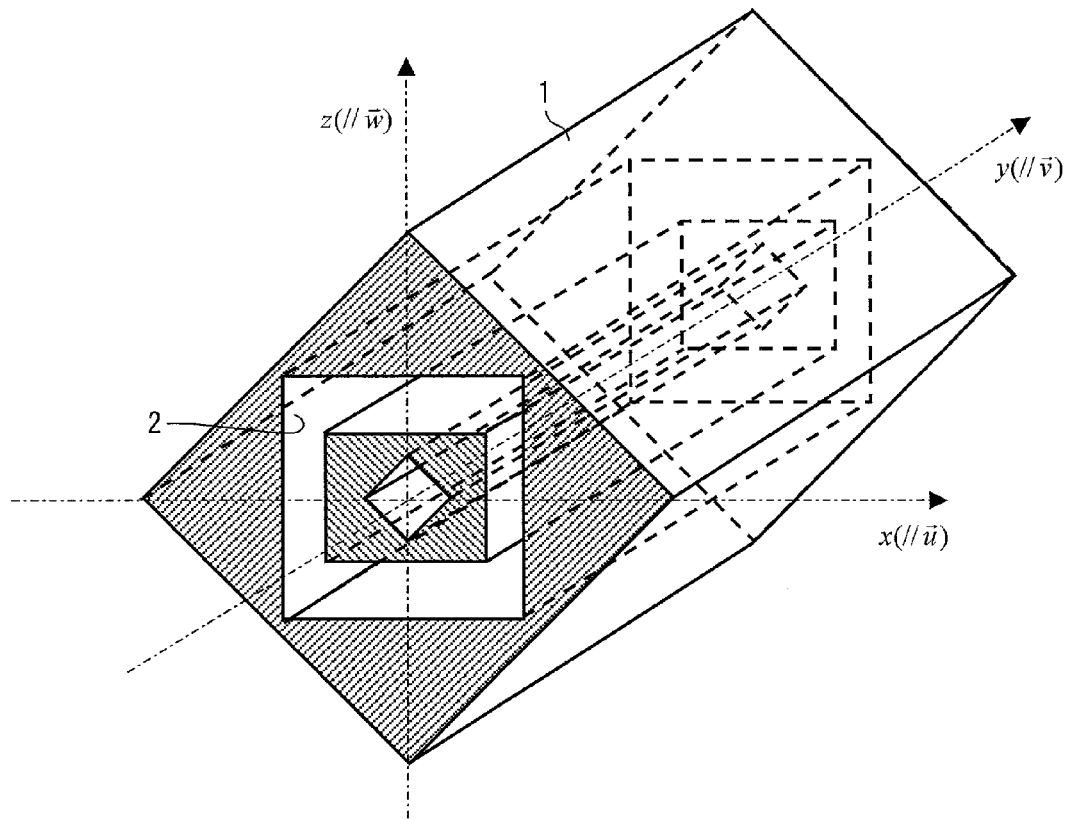

FIG. 22 is a perspective view schematically illustrating still another hollow light guide in accordance with Embodiment 5 of the present invention.

Figure 23:
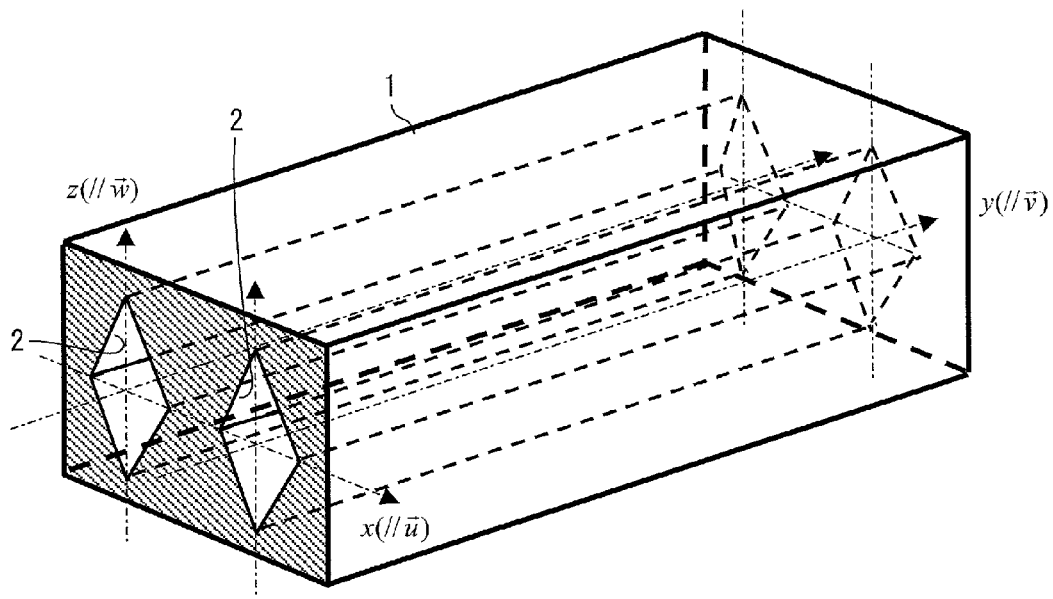

FIG. 23 is a perspective view schematically illustrating still another hollow light guide in accordance with Embodiment 5 of the present invention.

FIG. 24

Figure 24:
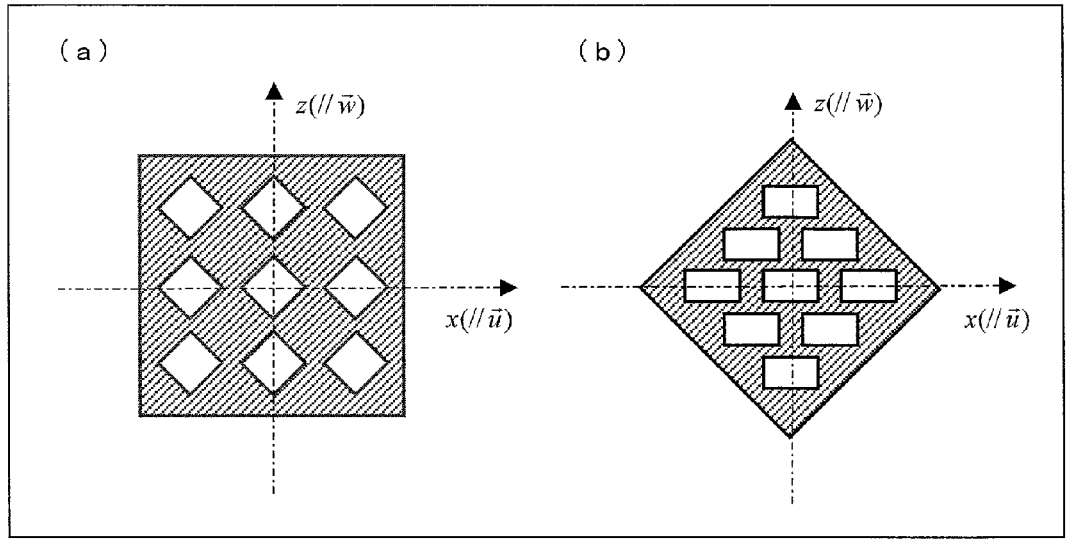

(a) and (b) of FIG. 24 are other top cross-sectional views each schematically illustrating a hollow light guide.

Figure 25:
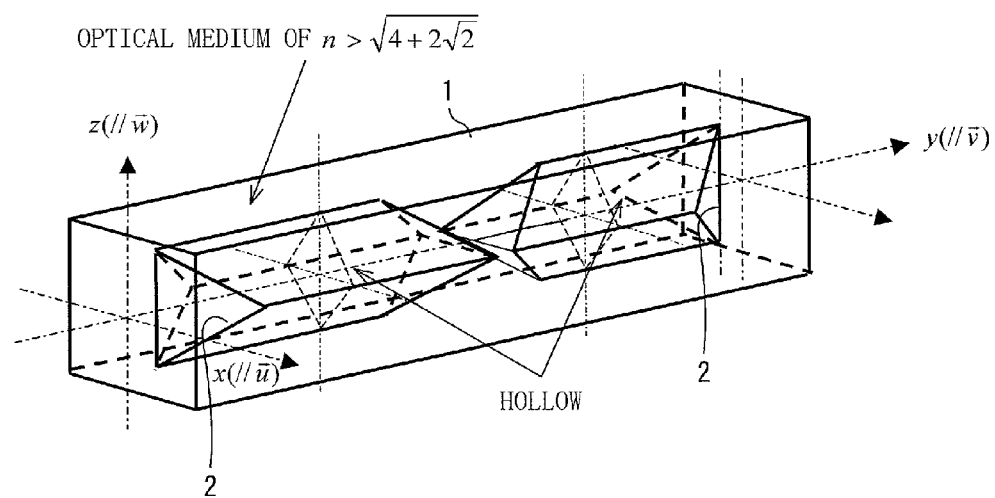

FIG. 25 is a perspective view schematically illustrating an optical resonator in accordance with Embodiment 6 of the present invention.

FIG. 26

Figure 26:
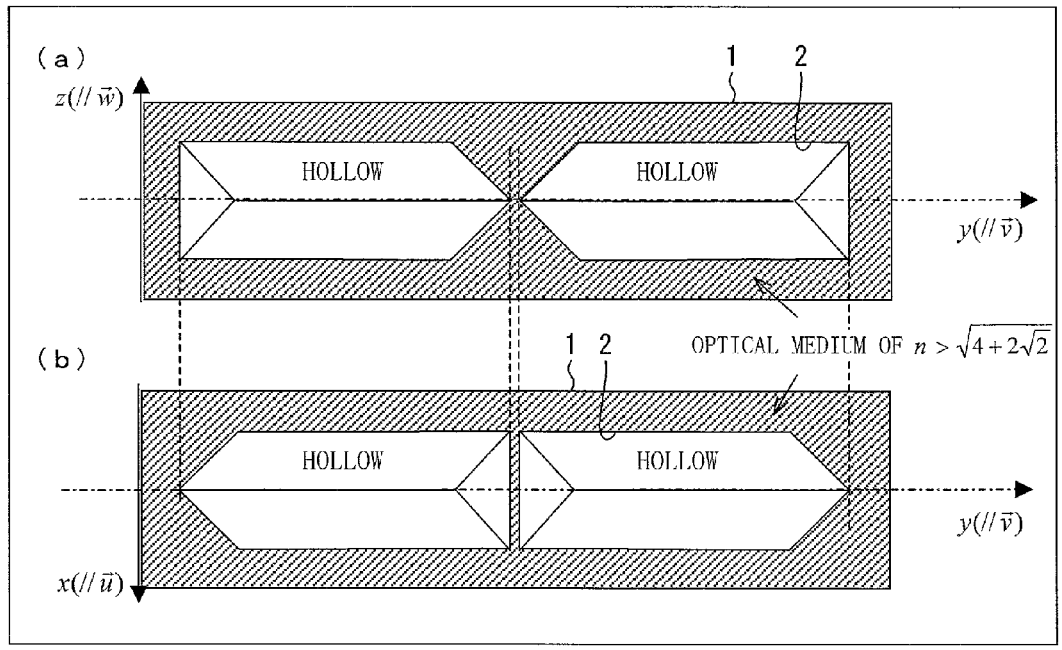

(a) and (b) of FIG. 26 are cross-sectional views each schematically illustrating the optical resonator illustrated in FIG. 25.

Figure 27:
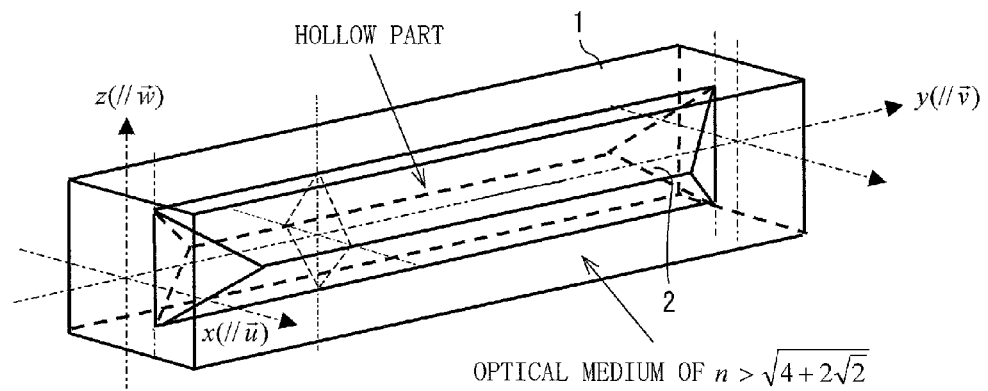

FIG. 27 is a perspective view schematically illustrating another optical resonator in accordance with Embodiment 6 of the present invention.

Figure 28:
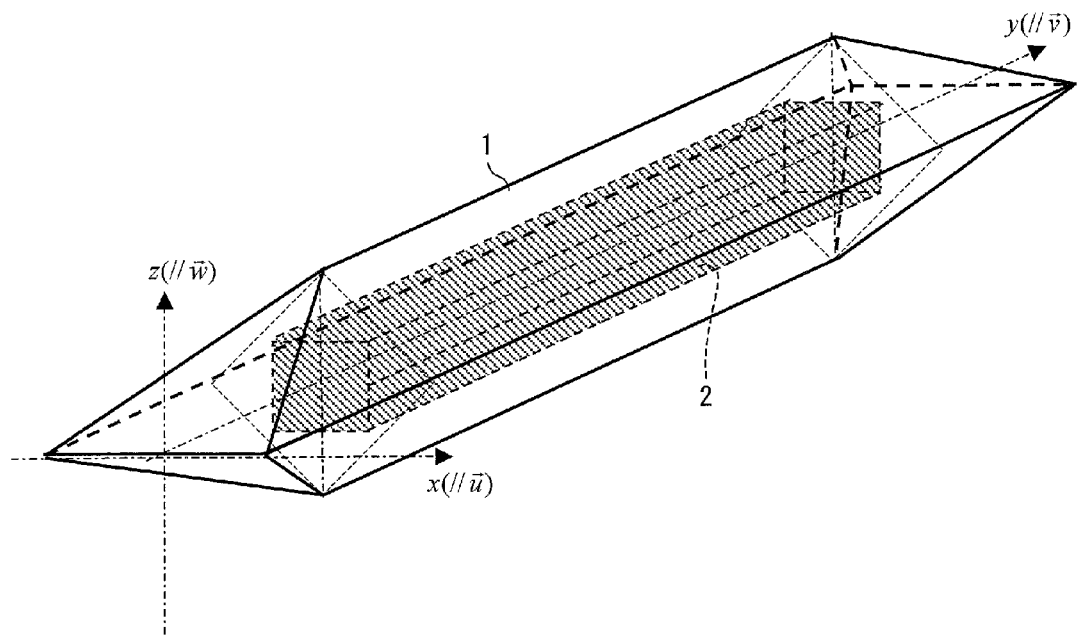

FIG. 28 is a perspective view schematically illustrating still another optical resonator in accordance with Embodiment 6 of the present invention.

Figure 29:
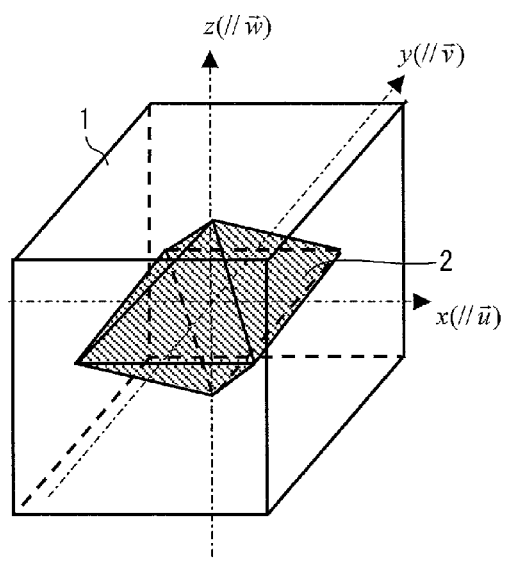

FIG. 29 is a perspective view schematically illustrating still another optical resonator in accordance with Embodiment 6 of the present invention.

Figure 30:
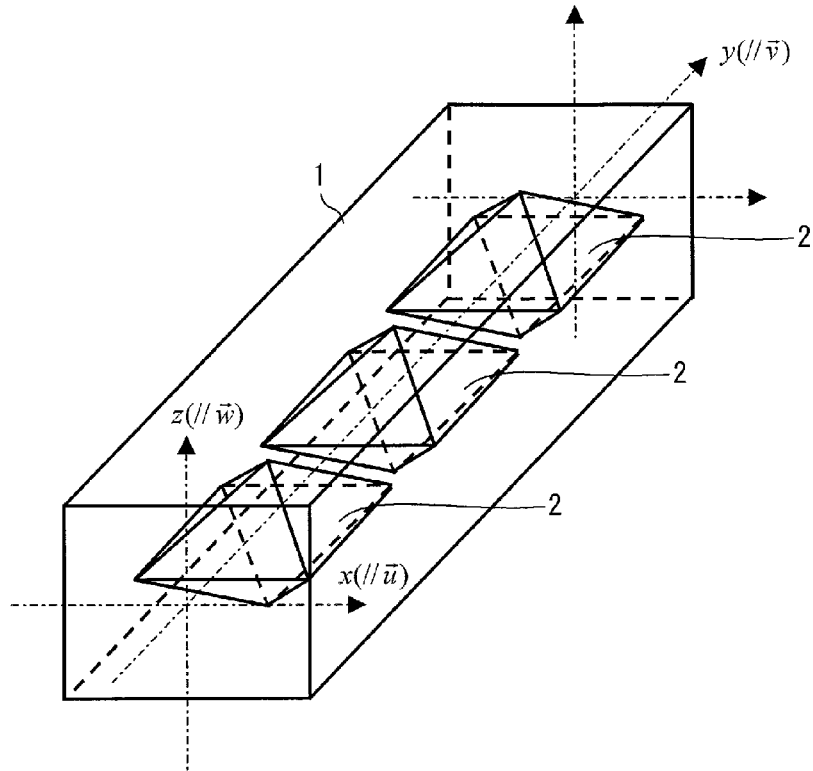

FIG. 30 is a perspective view schematically illustrating still another optical resonator in accordance with Embodiment 6 of the present invention.

Figure 31:
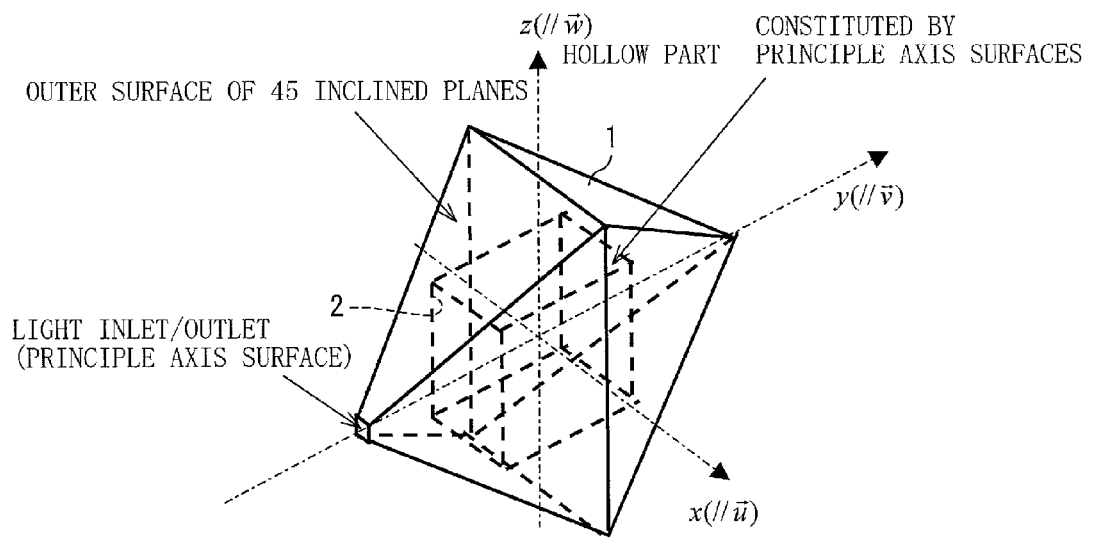

FIG. 31 is a perspective view schematically illustrating a specified optical resonator in accordance with Embodiment 6 of the present invention.

Figure 32:
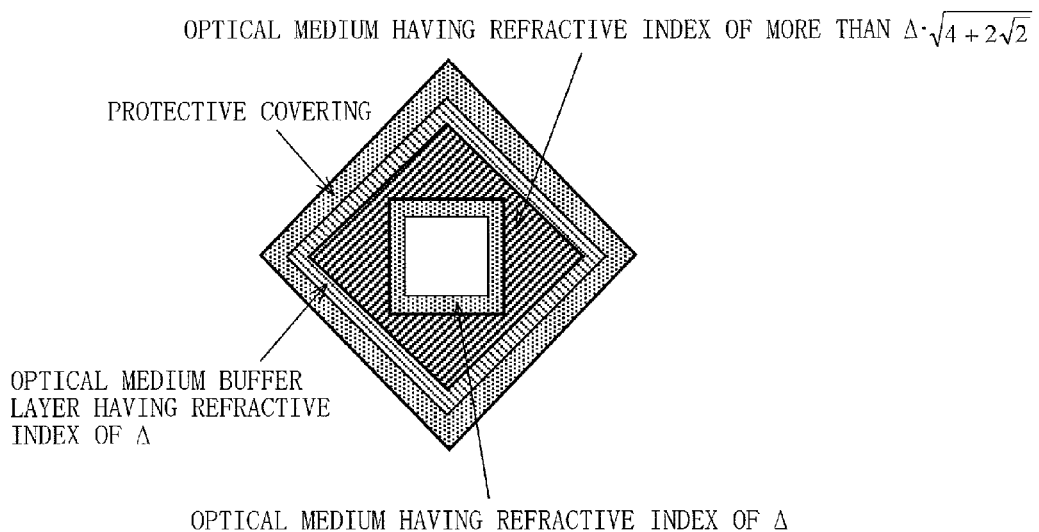

FIG. 32 is a cross-sectional view schematically illustrating another example of a hollow optical structure in accordance with Embodiments 5 and 6 of the present invention.

Figure 33:
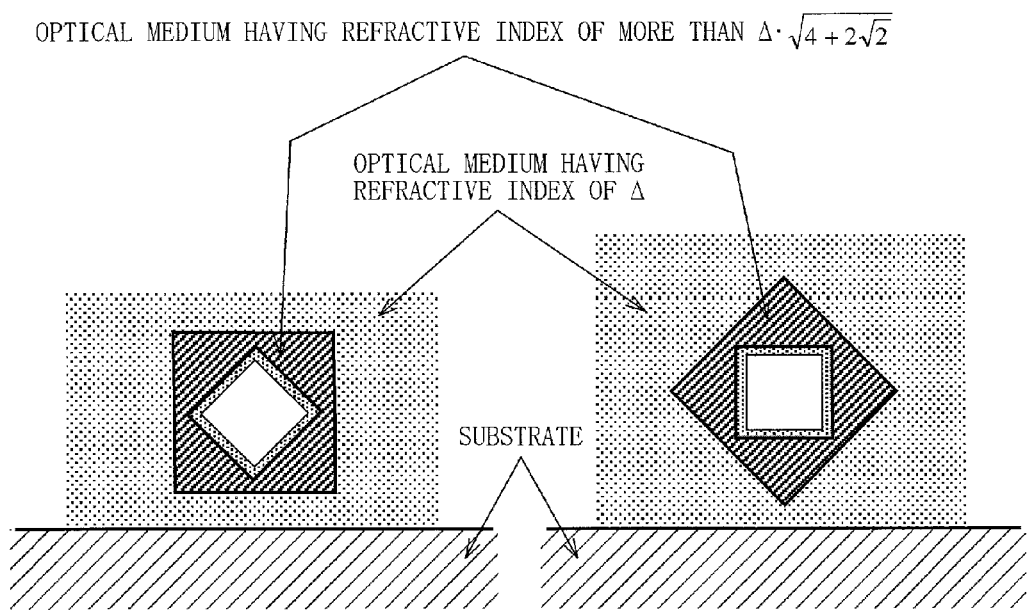

FIG. 33 is a cross-sectional view schematically illustrating another example of a hollow optical structure in accordance with Embodiments 5 and 6 of the present invention.

Figure 34:
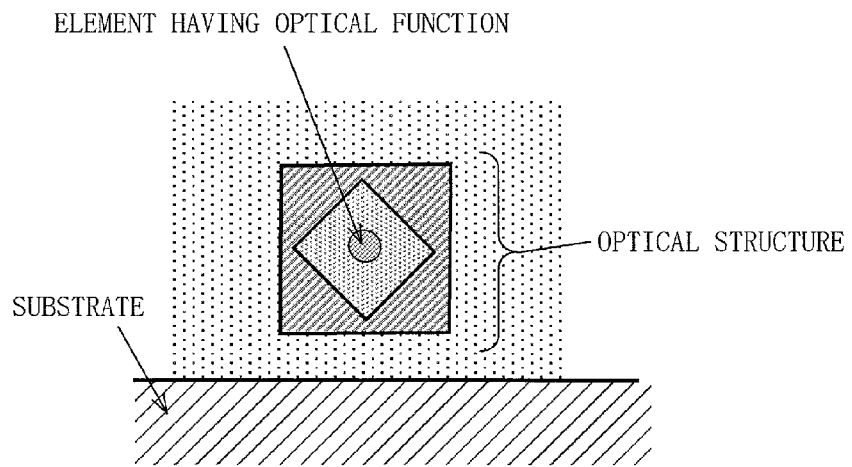

FIG. 34 is a cross-sectional view schematically illustrating another example of a hollow optical structure in accordance with Embodiments 5 and 6 of the present invention.

Figure 35:
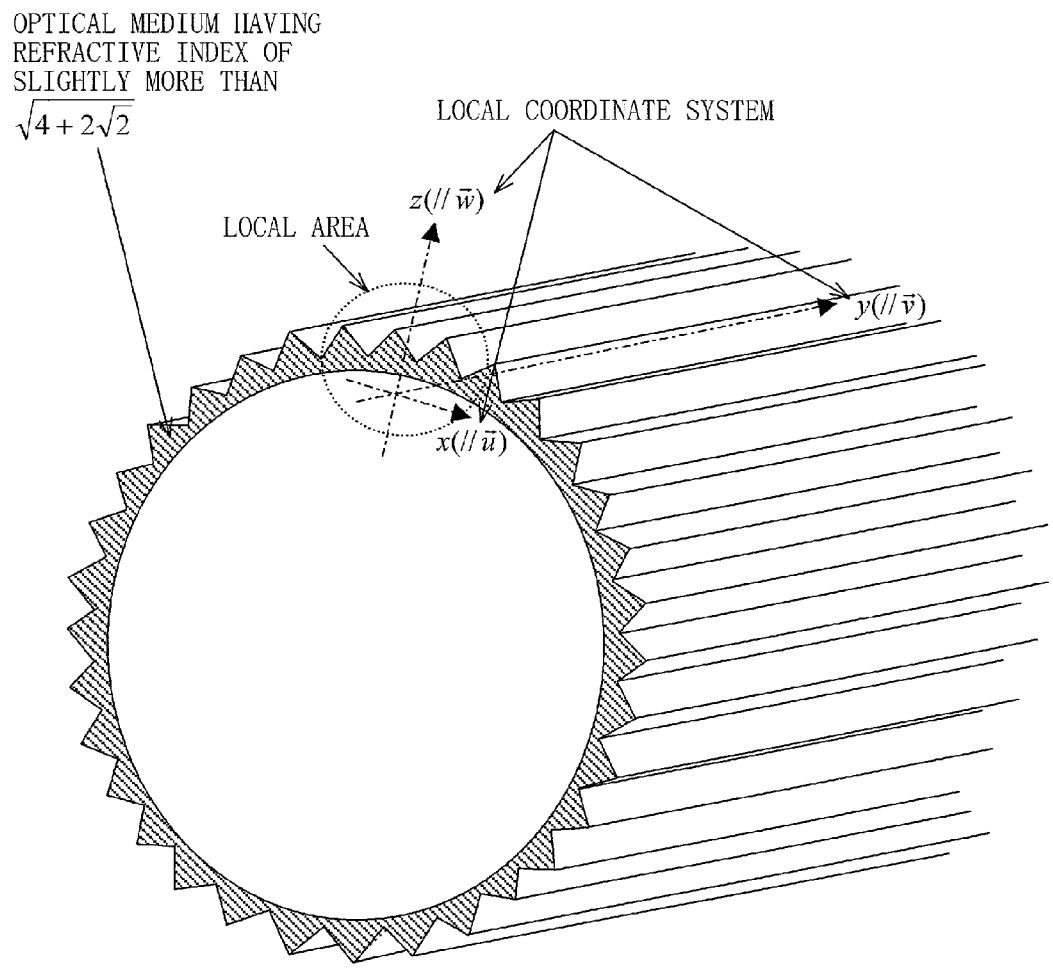

FIG. 35 is a perspective view schematically illustrating another example of a hollow optical structure in accordance with Embodiment 5 of the present invention.

Figure 36:
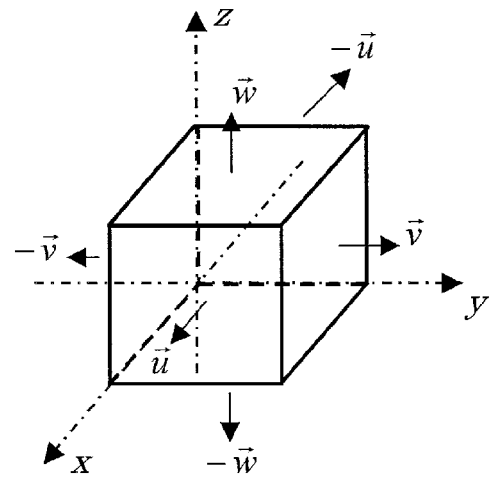

FIG. 36 is a view explaining a principle of the present invention.

Figure 37:
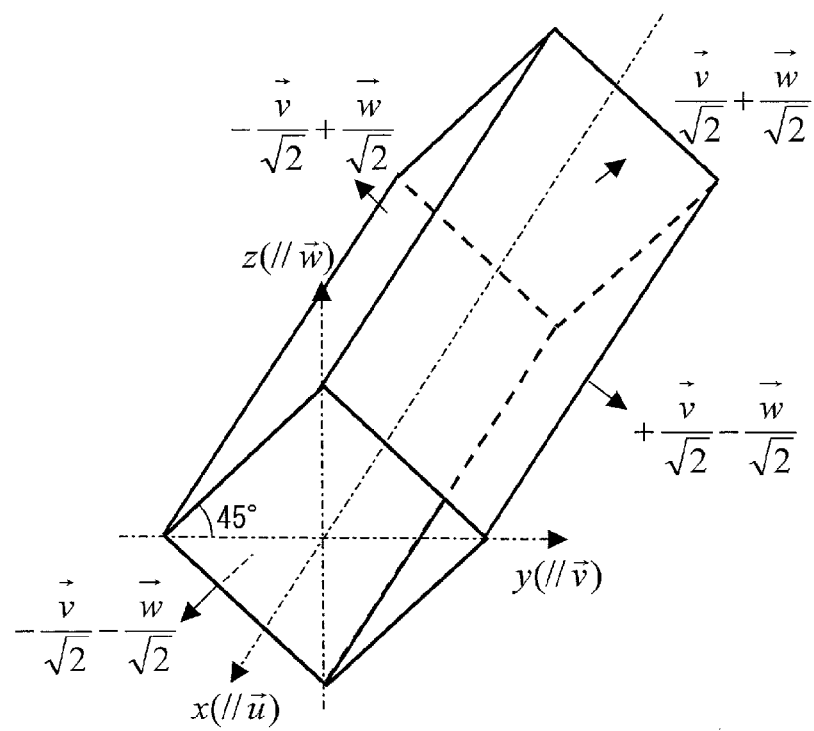

FIG. 37 is a view explaining a principle of the present invention.

Figure 38:
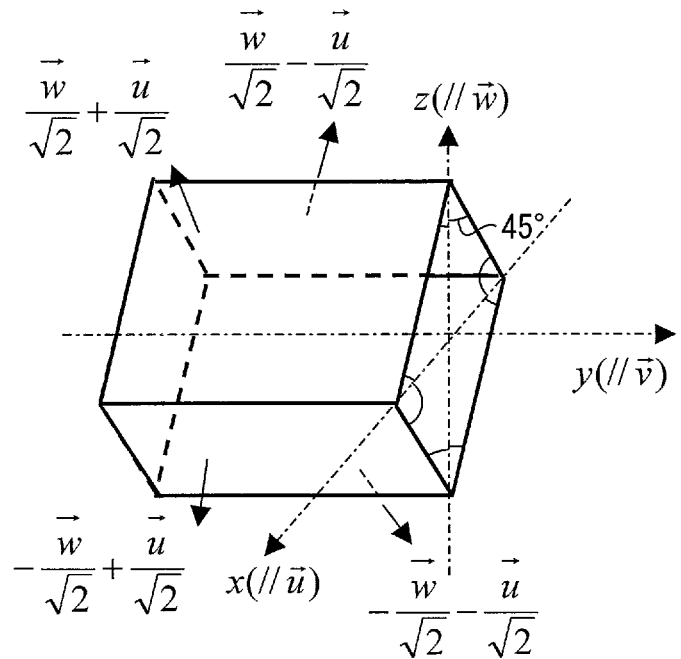

FIG. 38 is a view explaining a principle of the present invention.

Figure 39:
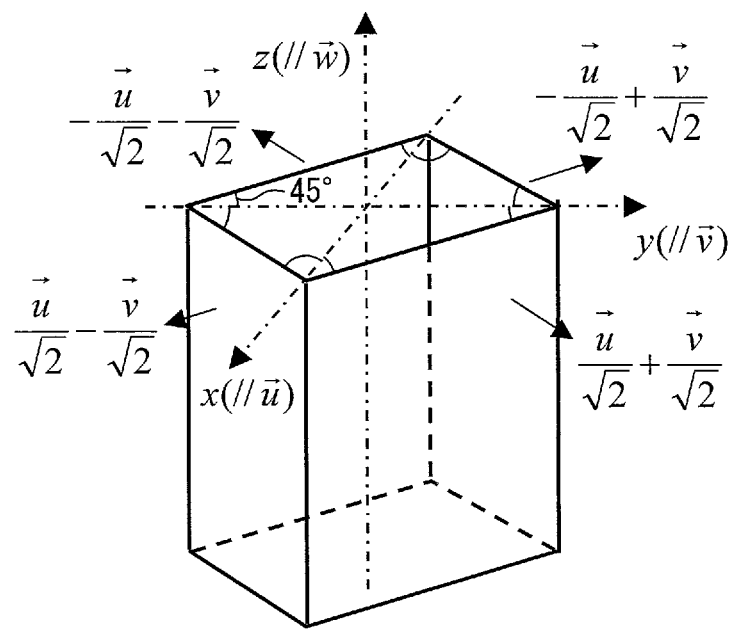

FIG. 39 is a view explaining a principle of the present invention.

Figure 40:
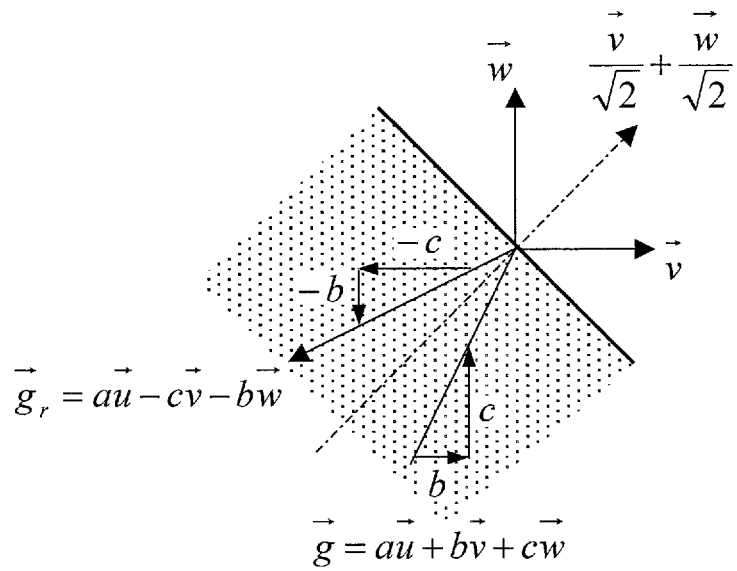

FIG. 40 is a view explaining a principle of the present invention.

Figure 41:
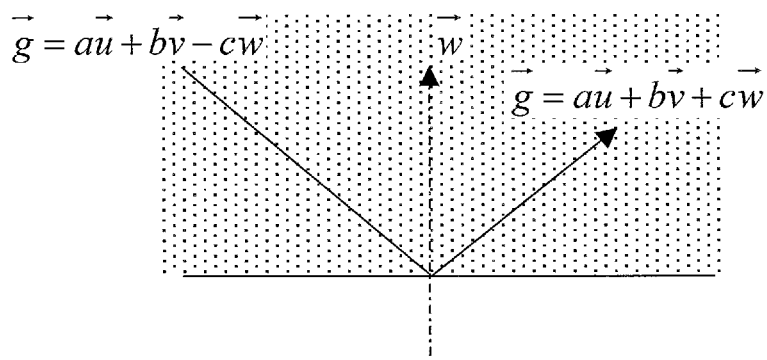

FIG. 41 is a view explaining a principle of the present invention.

Figure 42:
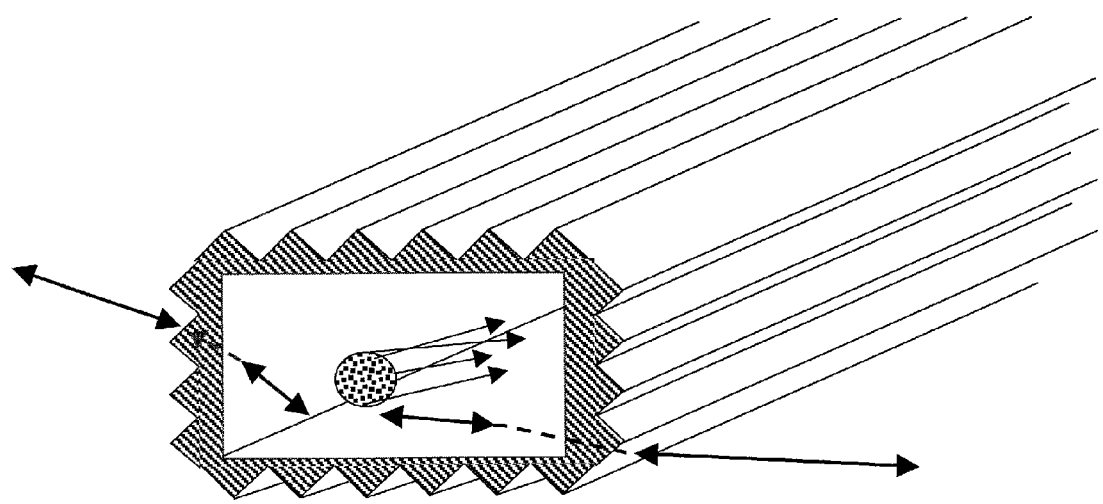

FIG. 42 is a perspective view schematically illustrating a conventional hollow light guide.

DESCRIPTION OF EMBODIMENTS

The following description will specifically discuss Embodiments of the present invention with reference to the drawings.

Embodiment 1

Example of Basic Structure of Reflective Material

First, an example of a basic structure of a reflective material of the present embodiment is to be described. The reflective material of the present embodiment has, for example, a right triangular ridge structure, a right quadrangular pyramid structure, or a triangular pyramid structure (see FIGS. 2 through 4).

Figure 3:
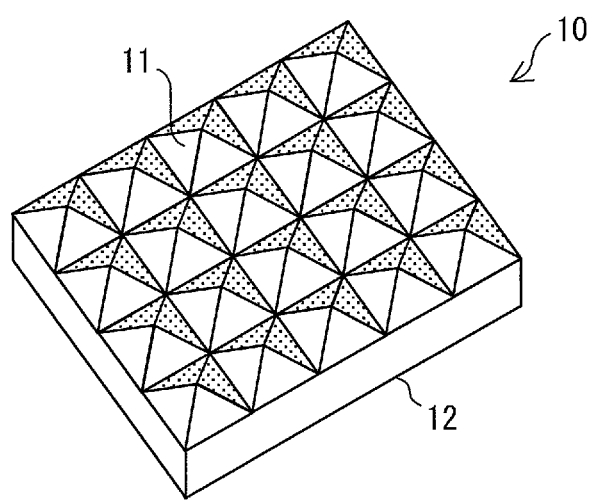
FIG. 3, which shows an embodiment of the present invention, is a perspective view illustrating another arrangement example of a reflective material.
Figure 4:
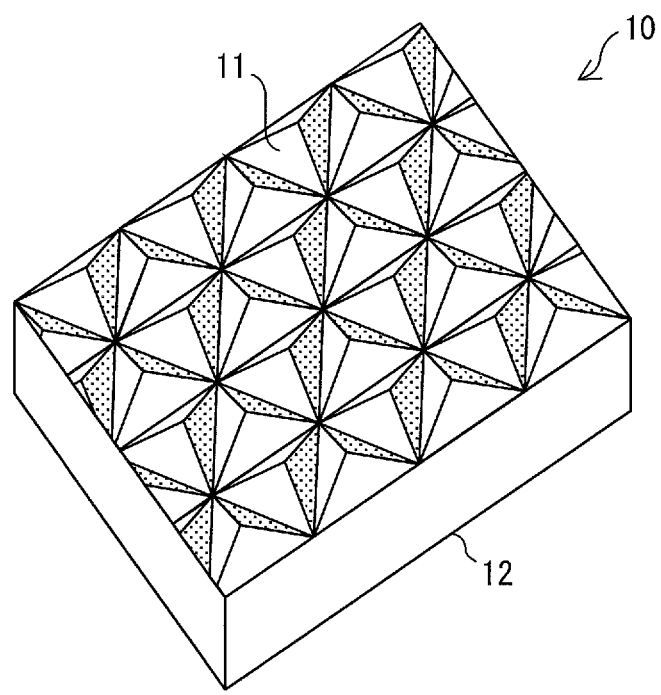
FIG. 4, which shows an embodiment of the present invention, is a perspective view illustrating still another arrangement example of a reflective material.

A reflective material 10 illustrated in each of FIGS. 2 through 4 has (i) a surface (hereinafter referred to as a first plane) 11 on which triangular ridges, quadrangular pyramids, or triangular pyramids are provided and (ii) a surface (hereinafter referred to as a second plane) 12 which is opposite to the first plane 11 and is flat. That is, the reflective material in accordance with the present invention has the first plane 11 on which inclined planes are aligned with no gap therebetween.

Figure 2:
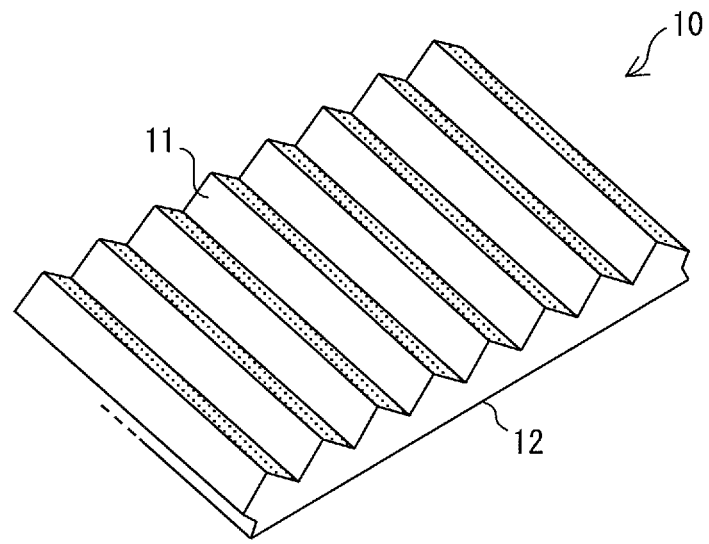
FIG. 2, which shows an embodiment of the present invention, is a perspective view illustrating an arrangement example of a reflective material.

The reflective material 10 illustrated in FIG. 2 has a right triangular ridge structure in which triangular ridges, each having a pair of surfaces that face each other and are orthogonal to each other, are provided in parallel to one another. The reflective material 10 illustrated in FIG. 3 has a right quadrangular pyramid structure in which quadrangular pyramids, each having a regular square bottom surface and four side surfaces in which two surfaces that face each other are orthogonal to each other, are provided in an array pattern. The reflective material 10 illustrated in FIG. 4 has a triangular pyramid structure in which triangular pyramids, each having a regular triangular bottom surface, are provided in an array pattern.

Note that a size of each inclined plane of the first plane of the reflective material 10 of the present invention is not particularly limited. Note, however, that a reflective material, having inclined planes that are sufficiently minute with respect to a thickness and a surface area of the reflective material, can be provided as a material which is substantially a flat plate. Further, the second plane is not limited to the flat surface illustrated in each of FIGS. 2 through 4 but can be a slightly curved surface that is close to a flat surface. That is, the second plane does not necessarily need to be a perfectly flat surface but can be a curved surface, provided that a reflective material having such a curved second plane has a desired optical property. This will be described later.

The reflective material which is arranged as above and is made of a transparent material having a high refractive index can totally internally reflect light without transmitting the light.

Note here that the following description takes, as an example, a right triangular ridge structure having a simplest arrangement, so as to discuss, with reference to (a) through (e) of FIG. 5, how light is totally internally reflected. For easy explanation, it is assumed that light beams travel in cross-sectional views of respective (a) through (e) of FIG. 5.

Light (see a beam A in (a) of FIG. 5) having entered a second plane at an entrance angle of $\theta_1$ is refracted in accordance with Snell's law and enters a reflective material at an angle of $\theta_2$. Then, the light beam A comes into contact with an inclined plane of a first plane at an entrance angle $\theta_3$. In this case, assuming that the light beam A exits to an outside of the reflective material from the first plane at an angle $\theta_4$, the following expression is derived based on Snell's law:

$$\sin\theta_1 = n\sin\theta_2, \sin\theta_4 = n\sin\theta_3$$

where the reflective material has a refractive index n. In a case where $n\sin\theta \geq 1$, no $\theta_4$ meets the expression, so that the light beam A is totally internally reflected.

In a case where light (see a light beam B (b) of FIG. 5) orthogonally enters the second plane, $\theta_1 = \theta_2 = 0$, and $\theta_3 = 45°$. Therefore, in a case where $n \geq 1/\sin(45°) = \sqrt{2} = 1.4142\ldots$, the light beam B is totally internally reflected twice by inclined planes of the first plane, and returns to the second plane. The light beam B reflected in the second plane is similarly totally internally reflected by the inclined planes, and consequently returns to the second plane.

Assume that light (see a light beam C in (c) of FIG. 5) has a greater refractive index. Even in a case where the light beam C does not orthogonally enter the second plane but enters the second plane at a finite entrance angle, the light beam C is totally internally reflected, and returns to the second plane. Considering a light beam which is different from each of the light beams illustrated in the respective (a) through (c) of FIG.

5 and enters the second plane at a point P illustrated in (d) of FIG. 5, the light beam enters the second plane at an angle of $\theta_2$ which falls within a range of a conical shape (see (d) of FIG. 5), which is represented by the following expression:

$$|\theta_2| \leq \sin^{-1}(1/n)$$

where $\sin \theta_1 = n \sin \theta_2$, and $|\sin \theta_1| \leq 1$

The light beam enters an internal surface of the first plane at a smallest entrance angle at a point (point Q in (d) of FIG. 5) at which the first plane is in first contact with the conical shape. Since $\theta_3 = 45° \pm \theta_2$, all entrance light beams are totally internally reflected in a case where $n \sin \theta \geq 1$ is met at a minimum entrance angle represented by the equation of $|\theta_{3min}| = 45° - \sin^{-1}(1/n)$.

Note here that the following expression (2) is derived based on the following expression (1). That is:

[Math. 1]

$$n \cdot \sin\left\{45° - \sin^{-1}\left(\frac{1}{n}\right)\right\} = n \left\{ \frac{1}{\sqrt{2}} \sqrt{1 - \left(\frac{1}{n}\right)^2} - \frac{1}{\sqrt{2}} \frac{1}{n} \right\} \geq 1 \quad (1)$$

derives

[Math. 2]

$$n \geq r/; \sqrt{4 + 2r/}; \sqrt{2r/x r/x} = 2.6131 \ldots \quad (2)$$

In other words, a reflective material which has the right triangular ridge structure illustrated in FIG. 2 and is made of a material having a refractive index greater than $n_{critical} = 2.6131 \ldots$ totally prevents light having entered the reflective material from any surface thereof at any entrance angle from passing through the reflective material.

The following will study how light beams travel after having been totally internally reflected by the first plane. A light beam analysis can be easily carried out in the case of the right triangular ridge structure. In a case where a trajectory of a light beam is drawn without consideration of a direction orthogonal to the cross-sectional view of (e) of FIG. 5, the trajectory has only the following two patterns illustrated in (e) of FIG. 5: a light beam D (indicated by a solid arrow in (e) of FIG. 5) and a light beam E (indicated by a dotted arrow in (e) of FIG. 5).

The light beam D (see (e) of FIG. 5) having entered the second plane is reflected by two inclined planes of the first plane before returning to the second plane. The light beam D having been totally internally reflected by one of the two inclined planes of the first plane enters the other of the two inclined planes of the first plane at $45° + |\theta_2|$, which is a greater entrance angle than an angle at which the light beam D has entered the one of the two inclined planes. Therefore, the light beam D is totally internally reflected, so as to be parallel to the light beam D having entered the one of the two inclined planes. Then, the light beam D returns to the second plane.

The light beam E (see (e) of FIG. 5) having been totally internally reflected by the one of the two inclined planes of the first plane is totally internally reflected by an entrance surface (the second plane). Then, the light beam E is totally internally reflected by the other of the two inclined planes of the first plane symmetrically with that having been totally internally reflected by the one of the two inclined planes, and returns to the entrance surface symmetrically with the light beam E having entered the second plane. Note that the light beam E does not need to be totally internally reflected and may be transmitted by the entrance surface after having been totally internally reflected by the one of the two inclined planes. However, after having been totally internally reflected by the one of the two inclined planes, the light beam E enters the entrance surface at an entrance angle α of $(\theta_3 + 45°)$, which is greater than $\theta_3$ by 45°. Therefore, in this case, given that the light beam E is supposed to be totally internally reflected at an angle of at least $\theta_3$, the light beam E is totally internally reflected by the entrance surface without fail.

Note that the light beams D and E, each of which returns to and enters the entrance surface at an angle that causes transmission, are not all transmitted but partially reflected by the entrance surface. However, such reflected light travels toward the inclined plane at an angle identical to an angle at which the light beam D or E has entered the entrance surface, and draws the trajectory of the light beam D or E again. Finally, all the reflected light passes through the entrance surface since the reflected light is totally internally reflected by the first plane light without fail without being transmitted.

The above description assumes that light beams travel in the cross-sectional views. Meanwhile, in a case where light beams contain components which travel orthogonally to the cross-sectional views, the light beams enter the inclined plane at a greater entrance angle. This allows the light beams to be easily totally internally reflected. Therefore, it can be concluded that the reflective material which has the right triangular ridge structure illustrated in FIG. 2 and is made of a material having a refractive index greater than $n_{critical} = 2.6131 \ldots$ totally prevents light having entered the reflective material from any surface thereof at any entrance angle from passing through the reflective material. Note that same applies to the case of the quadrangular pyramid structure.

As described earlier, entrance light which is limited in range of $\theta_2$ by passing through the second plane reaches the inclined plane of the first plane from an inside of the reflective material. However, the entrance light can be totally internally reflected by the first plane in a case where the reflective material has a structure in which the entrance light enters the inclined plane at an entrance angle not less than a critical angle. The entrance light, which is totally internally reflected by the first plane without fail, finally exits to an outside from the entrance surface.

As is clear from reciprocity of light, the reflective material in accordance with the present embodiment makes it possible to obtain a function of totally internally reflecting light entering the reflective material from the first plane of the reflective material. Namely, in this case, when light is transmitted through the first plane of the reflective material and then exits to an inside of the reflective material, an entrance angle at which the light reaches the second plane from the inside of the reflective material is limited by a shape of the first plane and a refractive index of the reflective material. Therefore, the light which enters the second plane at any time at an entrance angle not less than a critical angle $\theta n$ ($\theta n = \sin^{-1}(1/n)$) of total internal reflection can be totally internally reflected.

The reflective material in accordance with the present embodiment thus makes it possible to obtain a function of total internal reflection in accordance with the shape of the first plane and the refractive index of the reflective material. As described earlier, the right triangular ridge structure and the right quadrangular pyramid structure each having a refractive index of not less than $\sqrt{(4+2\sqrt{(2)})} = 2.6131 \ldots$ make it possible to achieve total internal reflection.

The above description takes the right triangular ridge structure as an example so as to easily carry out a light beam analysis. Each of the reflective material having the right triangular ridge structure and the reflective material having the right quadrangular pyramid structure needs to have a refractive index of not less than 2.6131 . . . so that light from any angle can be totally internally reflected. Many semiconductors such as Si, Ge and GaAs have such a refractive index in an infrared region, and materials such as ZnTe and SiC have such a refractive index in a visible region.

It is only necessary that a minute structure provided on the first plane of the reflective material of the present invention allow total internal reflection. Therefore, examples of the minute structure include various modifications such as a triangular pyramid, a pentagonal pyramid, and a hexagonal pyramid. It can be estimated that such a modification allows total internal reflection of light from any angle depending on a shape of the first plane and a refractive index of a material.

Note that a corner cube which is a triangular pyramid having three inclined planes orthogonal to each other is conventionally known as a structure in which light is totally internally reflected by aligning minute inclined planes. However, the corner cube is totally different from the reflective material of the present invention in principle of reflection since the corner cube is used as a retroreflector and causes a surface on which the minute inclined planes are aligned to be a mirror surface. In a case where a corner cube-shaped triangular pyramid is applied to the present invention, a condition under which light is totally internally reflected by a first inclined plane is $n \geq 2.175$ . . . , and the corner cube-shaped triangular pyramid seemingly carries out the function of the present invention. However, the light beam analysis carried out in the present invention has revealed that light is merely repeatedly subjected to internal reflection including reflection by an entrance surface several times and then exits from an inclined plane in at least a case where $n \leq 7.278$ . . . . Therefore, the corner cube-shaped triangular pyramid is not suitable for a structure of the first plane of the present invention, and the first plane of the present invention needs to have another shape. Light that vertically enters a bottom surface of a corner cube prism which is frequently used for total internal reflection is totally internally reflected twice by one of inclined planes and is then further totally internally reflected by an entrance surface. The light thus totally internally reflected by the entrance surface passes through the other of the inclined planes without being totally internally reflected in a case where the light enters the inclined plane at an angle as small as 15.8° and n is not more than 3.674. This shows that a corner cube prism provided with no reflective mirror is beyond common sense, does not function as an entire reflective mirror, and is hardly useful in the present invention. This also allows confirmation that the present invention has novelty.

Examples of a material which has a high refractive index and is transparent in a visible region encompass ZnTe (having a refractive index of 2.92), SiC (having a refractive index of 2.63), LiNbO$_3$ and LiTaO$_3$ (each having a refractive index of approximately 2.2), ZnSe (having a refractive index of 2.4), GaN (having a refractive index of 2.4), and ZnS (having a refractive index of 2.55 through 2.33). Most of such materials can be artificially synthesized, increased in size, and easily processed. SUMITA OPTICAL GLASS, Inc. has researched and developed glass having a refractive index of not less than 2, and a new material is expected to be found also in the future.

Each of the reflective material having the right triangular ridge structure and the reflective material having the right quadrangular pyramid structure needs to have a refractive index of not less than 2.613 so as to perfectly achieve total internal reflection. The reflective material is exemplified by materials such as ZnTe (having a refractive index of 2.92) and SiC (having a refractive index of 2.63) in a visible region. Such materials, which currently have problems of, for example, purity and loss, will be promising if the materials have an improved quality in the future. Examples of a material which is transmissive with respect to light in an infrared region encompass many semiconductor materials including Si (having a refractive index of 3.4) and Ge (having a refractive index of 4.0). Each of such semiconductor materials has a refractive index of not less than 3 and can be artificially synthesized. Therefore, the semiconductor materials are applicable to an infrared light Q resonator for use in scientific research and to an infrared light device.

Under such a condition, light having entered a reflective material from either a front surface or a back surface is totally internally reflected and then returns to an entrance surface. Therefore, according to for what the reflective material is to be used, the front surface and the back surface can be reversed to each other.

The reflective material can have a refractive index smaller than the above-described value. The reflective material having such a smaller refractive index can partially transmit light and yield a characteristic totally different from that of, for example, a common glass plate in direction in which the light is transmitted. This will be described later.

The reflective material in accordance with the present embodiment can be prepared by for, example, etching or cutting a flat plate made of the above-described material, thereby forming the first plane. Alternatively, the reflective material in accordance with the present embodiment can also be prepared by extruding or pressing hard glass melted at a high temperature. According to these methods, it is possible to easily produce a reflective material having a larger area and mass-produce a reflective material.

Embodiment 2

First Example of Structure Using the Reflective Material

Figure 1:
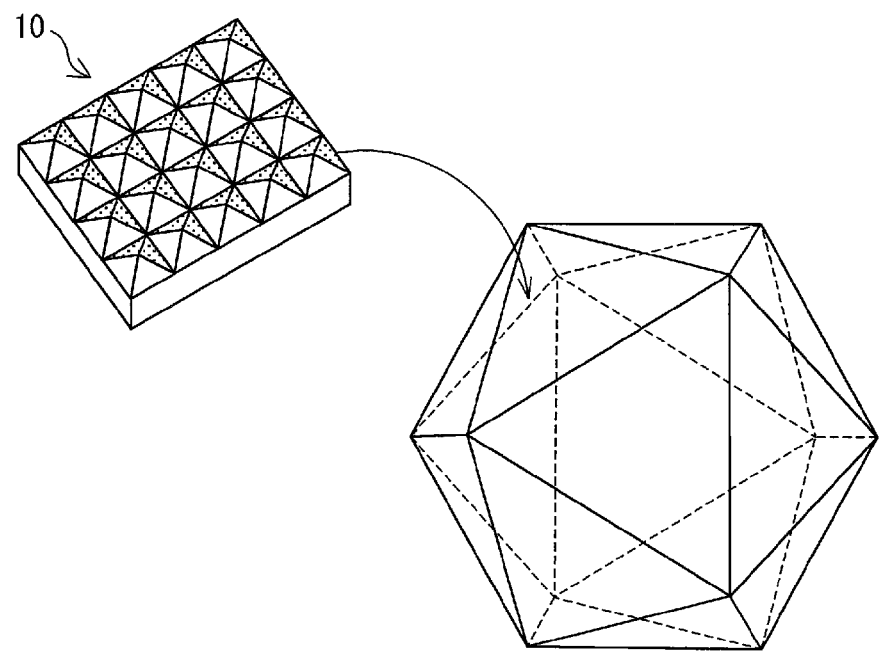
FIG. 1(a), which shows an embodiment of the present invention, is a perspective view illustrating an arrangement example of a structure.
FIG. 1(b), which shows an embodiment of the present invention, is a perspective view illustrating an arrangement example of a structure.
Figure 1:
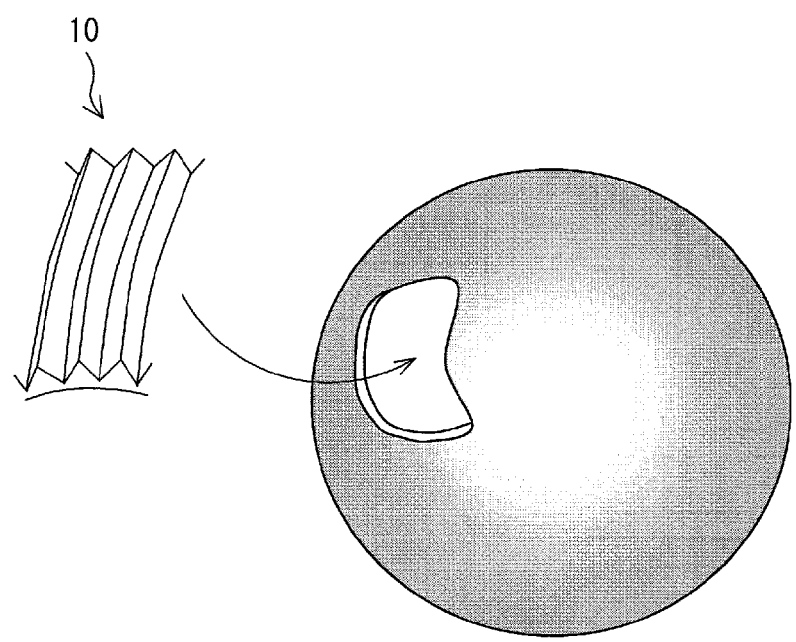

A structure in accordance with Embodiment 2 is a hollow polyhedral case (see FIG. 1(a)) or a hollow sphere (a curved solid including an ellipsoid) (see FIG. 1(b)) which is surrounded by the reflective material 10 in accordance with Embodiment 1. Note that in FIG. 1(a), a structure surrounding the polyhedral case is the reflective material having a quadrangular pyramid structure, and in FIG. 1(b), a structure surrounding the sphere is the reflective material having a triangular ridge structure. However, this is merely taken as an example, and a first plane of the reflective material can have any structure with respect to a shape of the structure.

Embodiment 2 is characteristic in that according to the reflective material 10 surrounding the structure, an optical medium is set to have a refractive index greater than a critical value depending on a structure so that, even in a case where light enters the polyhedron (or the sphere) either from an inner surface of the polyhedron (or the sphere) or from an outer surface of the polyhedron (or the sphere), the light is totally internally reflected and thus does not exit to a corresponding one of the inner surface and the outer surface.

The structure can have an extremely high optical Q value which prevents a leakage of light, and can function as an optical experimental sphere or an optical experimental polyhedron, or a decorative lighting apparatus or an artificial jewel which brightly glitters while being hollow and light.

Note that according to the structure, a front surface and a back surface of the reflective material 10 surrounding the structure can be reversed. Therefore, for example, in a case where the structure functions as the optical experimental sphere or the optical experimental polyhedron, an inner surface of the reflective material serves as a second plane. Meanwhile, in a case where the structure functions as the decorative lighting apparatus or the artificial jewel, an outer surface of the reflective material serves as the second plane.

FIG. 6(a) illustrates a simplest arrangement of the structure in accordance with Embodiment 2. According to the structure illustrated in FIG. 6(a), quadrangular pyramid structures in each of which opposite surfaces are orthogonal to each other are attached to respective sides of a cube, and the structure has a cubic hollow therein. Such a structure allows achievement of perfect reflection in a case where n>2.613 . . . without consideration of entry and radiation of light from an edge. Perfect reflection means that total internal reflection prevents light from an inside from exiting to an outside and prevents light from the outside from entering the inside. Similarly, FIG. 6(b) shows an example of a simple arrangement of the structure in accordance with Embodiment 2. According to the structure illustrated in FIG. 6(b), quadrangular pyramid structures are attached to respective two upper and lower surfaces of a cube (regular hexahedron), right triangular ridge structures are attached to respective four side surfaces of the cube, and the structure has a cubic hollow therein. The structure illustrated in FIG. 6(b) can also be regarded as a structure obtained by hollowing out an inside of a combined quadrangular pyramid structure so that the structure has a cubic hollow therein, the combined quadrangular pyramid structure having been obtained by the attachment of the quadrangular pyramid structures. The structure illustrated in FIG. 6(b) also allows achievement of perfect reflection in a case where n>2.613 . . . .

An effect of an edge part is described here. It is considered that, in a case where light which enters a surface of the reflective material and is totally internally reflected enters an edge part of the reflective material at an inconstant angle, the light is scattered and is transmitted in a minute amount (see FIG. 7). Therefore, in order to arrange a resonator having a high Q value, it is necessary to reduce transmission of light by causing a size of the edge part to be smaller than a wavelength.

In a case where the structure in accordance with Embodiment 2 is the polyhedral case, each of reflecting materials surrounding respective surfaces of the structure can have a flat plate structure (having a flat second plane). Meanwhile, in a case where the structure has a spherical structure, it goes without saying that a reflective material surrounding the structure also has a bend structure (having a curved second plane).

According to the reflective material having the bend structure, an entrance angle at which light enters the structure from a boundary between the reflective material having the bend structure and the structure slightly varies due to a bend in the reflective material. This causes a critical refractive index to be slightly large. However, a basic effect of the reflective material having the bend structure is identical to that of the reflective material having the flat plate structure. FIG. 8 illustrates transmitted light caused by the bend in a case where the reflective material having the bend structure is set to have a transmittance identical to a critical refractive index of the reflective material having the flat plate structure. It is desirable that a spherical surface have a refractive index larger than a critical value of a flat plate by several percentages so that light is not transmitted due to such a bend. Meanwhile, a boundary between adjacent surfaces of a polyhedral structure has a bend structure. It is therefore desirable that the boundary have a refractive index larger than the critical value of the flat plate by several percentages so that total internal reflection can be achieved at the boundary.

The polyhedral case and the spherical structure can be prepared by various methods. An optical material may be glass or amorphous provided that the optical material retains its optical characteristic. It is the easiest to form the polyhedral case and the spherical structure by molding a molten optical material.

A thin spherical structure having a large size of not less than several centimeters can be made of not only amorphous but also crystal, so as to have a curved surface with no large distortion. A polyhedral structure can be obtained by preparing surfaces of the polyhedral structure, optically polishing edges of the surfaces, and optically bonding the edges (carrying out an optical contact). It is expected that it is difficult to prepare a millimeter or submillimeter-sized minute sphere by use of a material other than amorphous or glass. Meanwhile, a technique called ball semiconductor for preparing an integrated circuit on a spherical surface has already been developed by an US company, Ball Semiconductor Inc. and Yamatake Corporation (present Azbil Corporation). According to the technique, it is possible to obtain two hemispheres by dividing a sphere into two spheres and hollowing out an inside of each of the two spheres, and to provide the two hemispheres with respective surface shapes and then optically bond the two hemispheres. A silicon photonics technology is currently highly advanced enough to be used for preparation of the structure of the present invention.

Embodiment 3

Second Example of the Structure Using the Reflective Material

As in the case of Embodiment 2, a structure in accordance with Embodiment 3 is a hollow polyhedral case (see FIG. 1(a)) or a hollow sphere (a curved solid including an ellipsoid) (see FIG. 1(b)) which is surrounded by the reflective material in accordance with Embodiment 1. Note that also according to the present embodiment, a first plane of the reflective material can have any structure with respect to a shape of the structure.

Note, however, that the reflective material surrounding the structure in accordance with Embodiment 3 is characteristic in that the reflective material which has a refractive index smaller than a critical value that causes total internal reflection causes light to be partially transmitted. As described earlier, the reflective material in accordance with Embodiment 3 has a shape identical to that of the reflective material in accordance with Embodiment 2. However, in a case where the reflective material in accordance with Embodiment 3 has the refractive index thus slightly reduced so that light can be partially transmitted, the structure in accordance with Embodiment 3 is expected to be applied to, for example, a decorative light bulb.

The following description takes a triangular ridge structure as an example. Light from a direction close to a front direction of a first plane having triangular ridges can exit toward a second plane, and the light having exited travels along a top surface of the second plane (see (a) of FIG. 9). Light that enters the reflective material from a direction substantially along the top surface of the second plane (a direction in which light enters the reflective material at an entrance angle of approximately 90°) can pass through the reflective material in the direction close to the front direction of the first plane due to bidirectionality of the reflective material. Further, light from a front direction of the second plane and light from a direction along the first plane are totally internally reflected and then return to an entrance surface (see (b) and (c) of FIG. 9).

In other words, light that enters the reflective material from the second plane at an entrance angle smaller than a specific entrance angle (light that enters from a direction close to the front direction of the second plane) can be totally internally reflected. Meanwhile, light that enters the reflective material at an entrance angle larger than the specific entrance angle (light that enters from a direction along the top surface of the second plane) is partially transmitted through the first plane. Note here that the specific entrance angle on which whether or not light is transmitted depends is determined by a shape of the first plane and a refractive index of the reflective material.

The reflective material having the refractive index smaller than the critical value which causes total internal reflection thus transmits light (see (a) of FIG. 9). In this case, however, light is refracted by a prism effect. Therefore, the light passes through the reflective material in an unexpected direction (Eyes will see an unexpected direction, for example, eyes will see an edge when the eyes try to see a right front direction, or eyes will see the right front direction when the eyes try to see the edge).

In a case where the structure in accordance with Embodiment 3 is applied to a decorative light bulb and a light emitter is provided in a central part of the decorative light bulb assuming that an inner surface of the decorative light bulb serves as a first plane (see FIG. 10(a)), the central part is dark when viewed from an outside of the decorative light bulb, and light seems to come only from a periphery of the decorative light bulb. In a case where the structure in accordance with Embodiment 3 is applied to a decorative light bulb and a light emitter is provided in a central part of the decorative light bulb assuming that an inner surface of the decorative light bulb serves as a second plane (see FIG. 10(a)), light emitted from the light emitter is merely totally internally reflected, and does not exit to an outside of the decorative light bulb. This allows the light emitter to be a high Q resonator even in a case where the refractive index is not more than the critical value. Meanwhile, in a case where the light emitter is provided so as to be shifted from the center, light is transmitted, and light is seen to glitter also from the outside of the decorative light bulb but only from a specific direction.

Embodiment 4

Third Example of the Structure Using the Reflective Material

A structure in accordance with Embodiment 4 is different from those in accordance with Embodiments 2 and 3 in that the structure in accordance with Embodiment 4 is not a hollow sphere or polyhedron surrounded by a reflective material but a part of the hollow sphere or polyhedron.

For example, a part of a sphere (for example, a hemisphere) made of the reflective material of the present invention is applicable to an accessory such as an artificial jewel (see FIG. 11). Such an arrangement also allows entrance light to be totally internally reflected in most of regions other than a peripheral region of the structure.

Note here that an optical structure of the present invention is made of a light-transmissive optical medium and the light-transmissive optical medium has a hollow part filled with an optical medium having a refractive index different from that of a surrounding light-transmissive optical medium. The hollow part herein refers to a spacial part filled with an optical medium having a refractive index different from that of an optical medium surrounding the hollow part. Therefore, an optical medium having a refractive index different from that of the surrounding light-transmissive optical medium is exemplified by air, and the hollow part filled with air becomes hollow.

The optical structure of the present invention prevents light from leaking to an outside from an inside of a hollow or prevents light from the outside of the hollow from entering the hollow, i.e., achieves only so-called total internal reflection. Embodiment 5 will describe an example of an optical waveguide in which example the optical structure of the present invention is applied to a light guide. Embodiment 6 will describe an example of an optical resonator in which example the optical structure of the present invention is applied to a resonator.

First, prior to description of Embodiments 5 and 6, the following description discusses a principle of total internal reflection carried out in a hollow structure of the present invention.

[Explanation of Principle of Total Internal Reflection]

First, the following description discusses a principal axis plane and a 45 inclined plane which constitute an optical structure of the present invention.

In a case where the following expression (3) represents unit vectors which are in parallel with respective principal axes that are x, y, and z-axes of a rectangular coordinate system, planes whose normal vectors are six kinds represented by the following expression (4) are principal axis planes (second planes) and correspond to six planes of a cube (regular hexahedron) illustrated in FIG. 36. Planes (45 inclined planes: first planes) each of which has a normal line that is orthogonal to one of these three axes and intersects with each of the other two of the three axes at an angle of 45° are planes whose normal vectors are twelve kinds represented by the following expression (5) (see FIGS. 37 through 39). In each of rectangular parallelepipeds illustrated in respective FIGS. 37 through 39, the planes (45 inclined planes: first planes) correspond to side surfaces of a pipe having a square cross section, the side surfaces being obtained in a case where the pipe is rotated by 45° on the x, y, or z-axis while being in parallel with that axis.

[Math. 3]

$$\vec{u}, \vec{v}, \vec{w} \quad (3)$$

[Math. 4]

$$\pm\vec{u}, \pm\vec{v}, \pm\vec{w} \quad (4)$$

[Math. 5]

$$\frac{\vec{v}}{\sqrt{2}} \pm \frac{\vec{w}}{\sqrt{2}}, -\frac{\vec{v}}{\sqrt{2}} \pm \frac{\vec{w}}{\sqrt{2}}, \frac{\vec{w}}{\sqrt{2}} \pm \frac{\vec{u}}{\sqrt{2}}, -\frac{\vec{w}}{\sqrt{2}} \pm \frac{\vec{u}}{\sqrt{2}},$$

$$\frac{\vec{u}}{\sqrt{2}} \pm \frac{\vec{v}}{\sqrt{2}}, -\frac{\vec{u}}{\sqrt{2}} \pm \frac{\vec{v}}{\sqrt{2}} \quad (5)$$

The following description discusses a principle of total internal reflection.

In a case where the expression (3) represents unit vectors which are in parallel with respective principal axes that are x, y, and z-axes of a rectangular coordinate system, an inner surface or an outer surface is obtained by combining any planes of the planes whose normal vectors are six kinds in total represented by the expression (4) (i.e., a combined principal axis plane obtained by combining principal axis planes described above). Namely, the combined principal axis plane is formed by combining a plurality of principal axis planes each of which is a plane that overlaps no combined 45 inclined plane (described later) and has a normal line in parallel with any one of the principal axes x, y, and z of the rectangular coordinate system.

A surface opposite to the principal axis plane, the outer surface, or the inner surface is an inclined plane (combined 45 inclined plane obtained by combining 45 inclined planes described above) whose normal line is orthogonal to one of these three axes and intersects with each of the other two of the three axes at an angle of 45°. Therefore, the surface opposite to the principal axis plane, the outer surface, or the inner surface is obtained by combining planes whose normal vectors are all or a part of twelve kinds represented by the expression (5). That is, the combined 45 inclined plane is formed by combining a plurality of 45 inclined planes each of which has a normal line that is orthogonal to one of the principal axes and is located at an angle of 45° with respect to each of the other two of the principal axes.

Normal vectors of the 45 inclined planes are located in bisector directions of respective two principal axes. Therefore, in a case where light beams come into contact with the 45 inclined planes and then are reflected, the light beams exchange their principal axis components with each other (note that the principal axis components may also change in sign). For example, in a case where a light beam whose light beam vector meets the following expression (6) enters a surface which is one of the 45 inclined planes and whose normal vector is represented by the following expression (7), a vector u component of the light beam vector is unchanged, a vector v component and a vector w component of the light beam vector are replaced with each other with their signs reversed (see FIG. 40), so that a line vector of reflected light is represented by the following expression (8).

[Math. 6]

$$\vec{g} = a\vec{u} + b\vec{v} + c\vec{w}, \quad a^2+b^2+c^2=1 \text{ (a,b,c are direction cosines of a straight line)} \tag{6}$$

[Math. 7]

$$\frac{\vec{v}}{\sqrt{2}} + \frac{\vec{w}}{\sqrt{2}} \tag{7}$$

[Math. 8]

$$\vec{g}_r = a\vec{u} - c\vec{v} - b\vec{w} \tag{8}$$

Meanwhile, in a case where the light beams come into contact with the surfaces represented by the expression (4) in which a normal line indicates a principal axis, components of the light beams merely change in sign. FIG. 41 shows an example of reflection in a principal axis plane.

For example, a light beam vector of a light beam which passes through a vector w surface and then enters, from a medium having a refractive index of 1, an optical medium having a refractive index n can be commonly represented by the following expression (9). However, in view of the above result, even after the light beam has been repeatedly reflected in any outer surface or inner surface in the optical medium having a refractive index n, the components of the light beam vector which components are represented by the expression (3) have their respective values represented by the following expression (10).

[Math. 9]

$$\vec{f} = \vec{u}\sin\theta\cos\phi + \vec{v}\sin\theta\sin\phi + \vec{w}\cos\theta, \quad 0 \leq \theta \leq \sin^{-1}(1/n) \tag{9}$$

[Math. 10]

$$\pm\sin\theta\cos\phi, \pm\sin\theta\sin\phi, \pm\cos\theta \tag{10}$$

That is, assuming that either sign can be selected, it follows that there are only 48 kinds of light beam vectors in the optical medium having a refractive index n (see the following expression (11)). Note here that, since neither a positive sign nor a negative sign is prioritized in the above expression and either the positive sign or the negative sign can be selected, one expression is selectable among eight combinations and there are six expressions. Forty-eight kinds of light beam vectors are thus obtained.

[Math. 11]

$$\pm\vec{u}\sin\theta\cos\phi \pm \vec{v}\sin\theta\sin\phi \pm \vec{w}\cos\theta, \pm \vec{u}\sin\theta\cos\phi \pm \vec{v}\cos\theta \pm \vec{w}\sin\theta\sin\phi \pm \vec{u}\sin\theta\sin\phi \pm \vec{v}\sin\theta \cos\phi \pm \vec{w}\cos\theta, \pm \vec{u}\sin\theta\sin\phi \pm \vec{v}\cos\theta \pm \vec{w}\sin\theta\cos\phi \pm \vec{u}\cos\theta \pm \vec{v}\sin\theta\cos\phi \pm \vec{w}\sin\theta\sin\phi, \pm\vec{u}\cos\theta \pm \vec{v}\sin\theta\sin\phi \pm \vec{w}\sin\theta\cos\phi \tag{11}$$

An inner product (a scalar product) of a light beam represented by the following expression (12) and for example, the expression (7) representing a normal line of one of the 45 inclined planes is a cosine of an entrance angle at which the light beam enters that 45 inclined plane and meets the following relational expression (13).

[Math. 12]

$$\vec{g} = a\vec{u} + b\vec{v} + c\vec{w} \tag{12}$$

[Math. 13]

$$\cos\theta_{abcvw} = (a\vec{u} + b\vec{v} + c\vec{w})\left(\frac{\vec{v}}{\sqrt{2}} + \frac{\vec{w}}{\sqrt{2}}\right) = \frac{b+c}{\sqrt{2}} \tag{13}$$

($\theta_{abcvw}$ is an entrance angle)

As shown in the above expression, a cosine of an intersection angle (entrance angle) of the light beam and the normal line of the 45 inclined plane is obtained by dividing a sum of/difference between two components by √2. It follows that there are only 12 kinds of cosines of intersection angles of 48 kinds of light beams (described earlier) and normal lines of all the 45 inclined planes of 12 kinds (described earlier) (see the following expression (14)).

[Math. 14]

$$(\pm\sin\theta\cos\phi \pm \sin\theta\sin\phi)/\sqrt{2}, (\pm\sin\theta\sin\phi \pm \cos\theta)/\sqrt{2}, (\pm\sin\theta\cos\phi \pm \cos\theta)/\sqrt{2} \tag{14}$$

Since it is necessary for reflection that an entrance angle be not more than 90° and a cosine be positive, it follows that the cosine has only 6 values (corresponding to six kinds of angles) represented by the following expression (15).

[Math. 15]

$$|\sin\theta\cos\phi \pm \sin\theta\sin\phi|/\sqrt{2}, |\sin\theta\sin\phi \pm \cos\theta|/\sqrt{2}, |\sin\theta\cos\phi \pm \cos\theta|/\sqrt{2} \tag{15}$$

In a case where Γ is herein substituted for these values, a sine of an entrance angle is $\sqrt{(1-\Gamma^2)}$, a condition for total internal reflection is $\sqrt{(1-\Gamma^2)}>1/n$, and $\Gamma<\sqrt{(1-1/n^2)}$, which is obtained by transformation. Note here that n refers to a refractive index of an optical medium constituting a hollow structure. That is, total internal reflection occurs provided that $\Gamma<\sqrt{(1-1/n^2)}$ is met.

Note here that, in a case where the following relational expression (16) is met and $1/n<\sqrt{(1-1/n^2)}$, total internal reflection occurs. This meets $n>\sqrt{2}$.

[Math. 16]

$$|\sin\theta\cos\varphi \pm \sin\theta\sin\varphi|/\sqrt{2} = |\sin\theta\sin(\varphi \pm \frac{\pi}{4})| \leq |\sin\theta| \leq \frac{1}{n} \quad (16)$$

Further, both sin θ and cos θ are positive since $0 \leq \theta \leq \sin^{-1}(1/n)$. In a case where the following relational expression (17) is met and $n>\sqrt{2}$ based on $0 \leq \theta \leq \sin^{-1}(1/n)$, $\sin(\theta+\pi/4)$ is an increasing function of θ in a range of $\theta<\pi/4$, and an upper limit value of the increasing function is given when $\theta=\sin^{-1}(1/n)$. This causes the expression (17) to be the following expression (18).

[Math. 17]

$$|\sin\theta\sin\varphi \pm \cos\theta|/\sqrt{2} \leq |\sin\theta + \cos\theta|/\sqrt{2} = \sin(\theta + \frac{\pi}{4}) \quad (17)$$

[Math. 18]

$$|\sin\theta\sin\varphi \pm \cos\theta|/\sqrt{2} \leq \sin(\theta + \frac{\pi}{4}) \leq \sin(\sin^{-1}(\frac{1}{n}) + \frac{\pi}{4}) = \frac{1}{\sqrt{2}}(\frac{1}{n} + \sqrt{1 - \frac{1}{n^2}}) \quad (18)$$

Note here that a condition for total internal reflection is represented by the following relational expression (19) based on the expression (18). In a case where the expression (19) is adjusted by multiplying both sides thereof by $\sqrt{2}\times n$, $\sqrt{(n^2-1)}>1+\sqrt{2}$. According to this, $n>\sqrt{(4+2\sqrt{2})}$.

[Math. 19]

$$\frac{1}{\sqrt{2}}\left(\frac{1}{n} + \sqrt{1 - \frac{1}{n^2}}\right) < \sqrt{1 - \frac{1}{n^2}} \quad (19)$$

As in the case of the expression (17), each of the last term of the expression (15) and a term of the following expression (20)≤sin(θ+π/4), so that $n>\sqrt{(4+2\sqrt{2})}\approx 2.6131$ . . . . This also meets $n>\sqrt{2}$, and it can be concluded that a condition under which total internal reflection occurs in the 45 inclined plane is $n>\sqrt{(4+2\sqrt{2})}\approx 2.6131$ . . . .

[Math. 20]

$$|\sin\theta\cos\varphi \pm \cos\theta|/\sqrt{2} \quad (20)$$

As is clear from the definition of a cosine, there are three kinds of cosines of entrance angles at which light beams enter the surfaces (principal axis planes) represented by the expression (4) (see the following expression (21)). The former two of these three kinds are in a relationship of the following expression (22). As in the case of the expression (16), in a case where $n>\sqrt{2}$, and the former two are smaller than $\sqrt{(1-1/n^2)}$, so that total internal reflection occurs (described earlier).

Meanwhile, the last one of the three kinds is in a relationship of $\cos\theta=\sqrt{(1-\sin^2\theta)}>\sqrt{(1-1/n^2)}$, so that no total internal reflection occurs. This is a matter of course since this angle is identical to an angle at which the light beams enter the surfaces first.

[Math. 21]

$$|\sin\theta\cos\varphi|, |\sin\theta\sin\varphi|, |\cos\theta| \quad (21)$$

[Math. 22]

$$|\sin\theta\cos\varphi|, |\sin\theta\sin\varphi| \leq \sin\theta \leq \frac{1}{n} \quad (22)$$

Accordingly, not only total internal reflection but also transmission occurs in the surfaces represented by the expression (4).

These 48 kinds of light beams, i.e., light beams having entered, through a surface (principal axis plane) represented by the expression (4), the optical medium having a refractive index n are totally internally reflected in the 45 inclined plane even if the light beams are repeatedly subjected to any internal reflection, so that the light beams cannot exit from the 45 inclined plane. Further, from the viewpoint of light reciprocity, light having entered the 45 inclined plane is totally internally reflected in the principal axis plane without fail even if the light follows any path, so that the light cannot exit from the principal axis plane. This causes a hollow pipe having a structure in which a first plane is a principal axis plane and a second plane opposite to the first plane is a 45 inclined plane (described earlier) to be a transmission line having no radiation mode. The hollow which is closed serves as a sealed optical space which prevents a light beam from exiting from an inside to an outside or prevents the light beam from entering the inside from the outside.

The inventor of the present invention thus first (i) carried out a light beam analysis including multiple reflection in an optical medium constituted by a 45 inclined plane and a principal axis plane and (ii) derived a condition for total internal reflection. Accordingly, the present invention based on this principle can be said to be totally novel.

[Basic Arrangement of the Present Invention]

FIG. 12 is a perspective view schematically showing a typical example of a basic arrangement of an optical structure of the present invention. The optical structure has a shape of a rectangular parallelepiped and is made of an optical medium having a refractive index n that meets $n \geq \sqrt{(4+2\sqrt{2})}$. The optical structure has a hollow part therein and the hollow part has a seemingly complicated shape. An outer surface 1 is constituted by six principal axis planes whose normal vectors are in parallel with the principal axes that are the x, y, and x-axis (see FIG. 12). An inner surface 2 is constituted by all twelve 45 inclined planes in total: (i) four surfaces which are located in a central trunk part of the hollow part and each of which has a normal line that is orthogonal to the y-axis and is located at an angle of 45° with respect to each of the x and z-axis; (ii) upper and lower surfaces which are located at both ends of the hollow part and each of which has a normal line that is located at an angle of 45° with respect to each of the y and z-axis and is orthogonal to the x-axis; and (iii) right and left four surfaces which are located at both ends of the hollow part and each of which has a normal line that is located at an angle of 45° with respect to each of the y and x-axis and is orthogonal to the z-axis. That is, the outer surface 1 serves as the second plane formed by combining a plurality of principal axis planes, and the inner surface 2 serves as the first plane formed by combining a plurality of 45 inclined planes. Note that the outer surface 1 and the inner surface 2 may be reverse to each other in their relationship. Namely, the outer surface 1 may serve as the first plane formed by combining a plurality of 45 inclined planes, and the inner surface 2 may serve as the second plane formed by combining a plurality of principal axis planes.

Accordingly, even if light having entered the optical medium from an outside through the principal axis planes is in direct contact with the 45 inclined planes of the inner surface 2 or is in contact with the 45 inclined planes after having experienced internal reflection, all the light is totally internally reflected and cannot enter the hollow part. That is, since there is no path through which a light beam enters the hollow part from the outside, there is also no path through which the light beam exits to the outside from the principal axis planes of the outer surface 1 after passing through the 45 inclined planes from the hollow part. In a case where there is such a path and the path is traced back, it follows that a path exists through which a light beam enters the hollow part from the outside. This refers to light reciprocity. That is, according to the arrangement, light cannot at all enter the hollow part from the outside since the light is totally internally reflected by the inner surface 2, and the light cannot at all exit from the hollow part to the outside since the light is totally internally reflected by the outer surface 1. Accordingly, the optical structure serves as an optical container, an optical resonator, or an optical storage in which light is perfectly confined.

It is also shown that a light guide illustrated in FIG. 13 of the following Embodiment 5 is obtained in a case where both ends of the rectangular parallelepiped are cut in the optical structure (see FIG. 12) so that a trunk part of a hollow part remains.

Embodiment 5

Example of Optical Waveguide

The present discusses an example of an optical waveguide in which example an optical structure of the present invention is applied to a light guide.

FIG. 13 is a perspective view schematically illustrating a light guide which has been most simplified by use of an optical structure of the present invention.

The light guide is obtained by hollowing out an inside of a rectangular parallelepiped which is made of an optical medium in which the outer surface 1 has a refractive index n that meets $n \geq \sqrt{(4+2\sqrt{2})}$ on each of a±vector u surface and a±vector w surface of the principal axis planes. The inside thus hollowed out has a shape of a rectangular parallelepiped which is inclined by 45° with respect to the rectangular parallelepiped made of the optical medium.

Accordingly, normal vectors of the inner surface 2 are four surfaces (each of which is a 45 inclined plane described earlier in [Explanation of Principle of Total Internal Reflection]) that are (vector u±vector w)/√2 surfaces and (−vector u±vector w)/√2 surfaces. As described earlier in [Explanation of Principle of Total Internal Reflection], light having entered the optical medium from the hollow part and then followed any path is totally internally reflected in the outer surface. Further, a±vector v surface is irrelevant to the structure illustrated in FIG. 13 except for an entrance and an exit of the structure. Side surfaces with which light beams are in contact and in which the light beams are reflected, for example are the ±vector u surface, the ±vector w surface, and the (vector u±vector w)/√2 surfaces each of which contains no vector v.

Therefore, a vector v component of a light beam vector is not changed by reflection. That is, even if the vector v component of the light beam vector is reflected, light is unchanged and travels. It goes without saying that there exits no radiation mode.

Accordingly, also in a case where light from a lens or a different light guide is concentratedly introduced in the hollow part, the light can be transmitted to the exit without a coupling loss and a conversion to a radiation mode.

As described earlier, a hollow light guide illustrated in FIG. 13 has (i) the outer surface 1 constituted by the principal axis planes and (ii) the inner surface 2 constituted by the 45 inclined planes. Alternatively, a similar effect can also be yielded by a light guide having the (i) the inner surface 2 constituted by the principal axis planes and (ii) the outer surface 1 constituted by the 45 inclined planes (see FIG. 14).

Alternatively, the light guide may also be arranged such that two light guides are shifted in an x direction so that their respective hollow parts overlap each other (see FIG. 15). That is, in FIGS. 13, 14, and 15, the light guides in each of which no change occurs in a y direction (each of an inner surface and an outer surface of the light guide (i) has a normal line that is orthogonal to the y-axis (has a normal vector whose vector v component is 0 (zero)) and (ii) is in parallel with the y-axis) have an advantage such that a velocity at which light travels in the y direction is unchanged even if the light is reflected.

In view of the above, (a) through (d) of FIG. 16 show, as examples of another light guide in which no change occurs in the y direction, respective cross sections each of which is orthogonal to the y-axis.

(a) of FIG. 16 illustrates the cross section which is orthogonal to the y-axis of a hollow light guide in which the inner surface and the outer surface of the light guide illustrated in FIG. 15 have been replaced with each other. (b) of FIG. 16 illustrates the cross section which is orthogonal to the y-axis of a light guide in which a shape of the inner surface 2 has been changed so that a hollow part of the light guide illustrated in (a) of FIG. 16 has an M-shaped cross section. (c) of FIG. 16 illustrates the cross section which is orthogonal to the y-axis of a light guide in which triangular ridges 1a of the outer surface 1 of the light guide illustrated in FIG. 15 have been increased in number. (d) of FIG. 16 illustrates the cross section which is orthogonal to the y-axis of a light guide in which the inner surface and the outer surface of the light guide illustrated in Fig. (c) of FIG. 16 have been replaced with each other.

Next, each of FIGS. 17 and 18 illustrates a light guide which has 45 inclined planes in which each of the outer surface 1 and the inner surface 2 has a normal vector whose component in a vector v direction (component in a y-axis direction of the light guide) is not 0 (zero).

The light guide illustrated in FIG. 17 uses eight 45 inclined planes for the outer surface, whereas the light guide illustrated in FIG. 18 uses all the twelve 45 inclined planes for the outer surface. According to these light guides, a hollow part (the inner surface 2) is constituted by principal axis planes. Alternatively, the inner surface 2 and the outer surface 1 may be replaced with each other, not to mention. According to the light guides, reflection of light in the 45 inclined planes causes a change in value of a vector v component of a light beam vector. Therefore, the light cannot easily travel in the y-axis direction and slowly travels while being repeatedly reflected also backward and forward and accumulating the light. This causes such a light guide to serve as a slow-wave transmission line or an accumulation transmission line.

The above description discuses a hollow part of a light guide which part (i) has at least two surfaces that are opened and (ii) has a linear transmission structure in which light having entered one of the at least two surfaces exits from the other of the at least two surfaces. However, a structure of the hollow part is not limited to this. The structure of the hollow part may be (i) a reflection structure in which light enters a single opened surface and the light exits from the single opened surface, (ii) a bend structure in which light having entered the hollow part bends while traveling through the hollow part and then exits from the hollow part, or (iii) a branch structure in which light having entered the hollow part is branched while traveling through the hollow part.

The light guide whose hollow part has the reflection structure is exemplified by a light guide illustrated in FIG. 19.

According to the light guide illustrated in FIG. 19, ends of the hollow part are narrowed so as to have a wedge-shaped part at an angle of 45°. Light is reflected in or transmitted through the wedge-shaped part of the hollow part 3. Even if the light is transmitted through the wedge-shaped part of the hollow part 3, the wedge-shaped part has a surface which is a part of the 45 inclined planes. Therefore, the light having been transmitted through the wedge-shaped part is totally internally reflected in the outer surface 1 and does not exit to an outside (as described earlier in [Explanation of Principle of Total Internal Reflection]). In view of this, according to the light guide illustrated in FIG. 19, light is consequently subjected to 100% reflection, and light having entered the hollow part from the outside returns after having experienced internal reflection. Namely, the light travels backward on a non-radiation mode transmission line.

The light guide whose hollow part has the bend structure is exemplified by a hollow light guide illustrated in each of (a) and (b) of FIG. 20.

According to the hollow light guide, a bend end part (bend part 4) of the hollow part is formed as the 45 inclined planes (see (a) and (b) of FIG. 20). In this part formed as the 45 inclined planes, a part of light is reflected and travels through the hollow part in a direction shifted by 90°, whereas another part of the light enters an optical medium by refraction, is totally internally reflected in the outer surface, and returns to a direction from which the light comes. However, given the relationship between the inner surface 2 and the outer surface 1, light transmitted through the inner surface 2 of the hollow part is totally internally reflected in the outer surface 1 and is not radiated. This prevents the light from leaking to an outside.

The hollow part may have the branch structure to which the light guide having the bend structure is applied and in which light having entered the hollow part is branched while traveling through the hollow part. For example, each of the light guides illustrated in respective (a) and (b) of FIG. 21 has a hollow part having the branch structure.

The hollow light guide has the hollow part in which a three-forked road 5 and two bend parts 4 are provided (see (a) and (b) of FIG. 21).

The three-forked road 5 is formed by a wedge-shaped protrusion constituted by the 45 inclined planes. Each of the two bend parts 4 is identical in arrangement to the bend part 4 illustrated in each of (a) and (b) of FIG. 20. Therefore, according to the principle of total internal reflection (described earlier), light transmitted from an input in the non-radiation mode is repeatedly complicatedly reflected in the three-forked road 5 and the two bend parts 4. However, since the light is totally internally reflected in the outer surface 1 without fail, the light does not leak to an outside and most of the light is transmitted equally through two transmission lines, so that a part of the light is reflected and returns. However, since light transmitted through the inner surface 2 of the hollow part is totally internally reflected in the outer surface 1, the arrangement absolutely prevents light from leaking to the outside from a part other than a light entrance/exit part of the light guide.

According to the principle of total internal reflection (described earlier), in a case where a plurality of hollow parts are provided in an optical structure, it is possible to combine hollow parts or completely disconnect the combination depending on how to form surfaces.

For example, FIG. 22 shows an example of a double light guide in which a combination of two hollow parts is disconnected.

According to the double light guide, a hollow part of an optical structure in which the inner surface 2 constituted by the principal axis planes and the surface 1 constituted by the 45 inclined planes face each other is provided with a gap, and another light guide is provided in a floating state in the hollow part constituted by the inner surface 2 (see FIG. 22). The another light guide is supported by an input/output part of the light guide. Note that, in a case where it is difficult for the input/output part of the light guide to support the another light guide, the hollow part or the like is filled with a low-refractive index material (having a refractive index of Δ), and the inner structure, i.e., the another light guide is retained by being embedded in the hollow part or the like. In this case, it is only necessary that a high-refractive index material have a refractive index of more than $\sqrt{(4+2\sqrt{2})} \cdot \Delta$ (here, $\Delta \geq 1$).

Use of a hollow structure of the present invention thus makes it possible to arrange a double, triple, or multiple hollow structure by inserting the hollow structure of the present invention, via a gap, in a hollow part of a hollow optical structure in which the principal axis planes and the 45 inclined planes face each other.

According to the principle of total internal reflection (described earlier), a combined light guide illustrated in FIG. 23 may be arranged by combining two light guides illustrated in FIG. 13.

According to the combined light guide, light enters/exits from the two light guides, and the light is transmitted. However, the combined light guide is arranged such that the light is absolutely prevented from being radiated to an outside.

According to a hollow light guide illustrated in FIG. 23, two hollows (hollow parts) are provided in parallel with each other. Such a hollow light guide may be regarded as two light guides since light comes and goes to/from the two light guides. Alternatively, the hollow light guide may also be regarded as one combined light guide.

Further, in a case where such hollows are provided in large numbers and a ratio of a hollow part to the light guide is increased, the light guide can be regarded as one hollow having a large aperture. Therefore, the light guide is suitable for large-amount electric power light transmission as in the case of one hollow having a large aperture. As described earlier, in a case where a plurality of hollows are provided, a cross section of the light guide has a sponge gourd structure (see (a) and (b) of FIG. 24). Therefore, the arrangement makes it possible to build a lighter and stronger light guide as compared to one hollow which is identical in capacity to the arrangement and has a large aperture.

(b) of FIG. 24 illustrates a hollow light guide obtained by rotating a light guide of (a) of FIG. 24 by 45°. The hollow light guide of (b) of FIG. 24 has an operational effect which is identical to that of the light guide of (a) of FIG. 24.

Embodiment 6

Example of Resonator

The present embodiment discusses an example of an optical resonator in which example an optical structure of the present invention is applied to a resonator.

An example of a basic arrangement in which an optical structure of the present invention is applied to an optical resonator has already been illustrated in FIG. 12 as a basic arrangement of the present invention. Similarly, each of FIGS. 25 and 26 illustrates an example of a resonator to which an optical structure of the present invention is applied and which has a typical structure. FIG. 25 is a perspective view schematically illustrating an optical resonator in accordance with the present embodiment. (a) of FIG. 26 is a cross-sectional view schematically illustrating a case where the optical resonator illustrated in FIG. 25 is seen from its side surface. (b) of FIG. 26 is a cross-sectional view schematically illustrating a case where the optical resonator illustrated in FIG. 25 is seen from its top surface.

The resonator illustrated in FIG. 25 is obtained by practically using a reflection light guide of FIG. 19. According to the resonator, two hollow parts (hollows) are provided along the y-axis just so as to face each other in the mirror (see (a) and (b) of FIG. 26). Each of the two hollow parts serves as a hollow resonator in a case where one end of the hollow part of the light guide illustrated in FIG. 13 and having a basic arrangement is narrowed in a vertical direction so as to have a wedge-shaped part and closed (an inclined plane is located at an angle of ±45° with respect to each of the z-axis and the y-axis) and the other end of the hollow part of the light guide is narrowed so as to have a wedge-shaped part and closed (an inclined plane is located at an angle of with respect to each of the x-axis and the y-axis).

Side surfaces (the inner surface 2) of the hollow (hollow part) are four surfaces each of which is inclined by 45° with respect to each of the x-axis and the z-axis. Therefore, the hollow has all the twelve kinds of 45 inclined planes. A rectangular parallelepiped, which is provided on an outside of an optical medium that surrounds the hollow and has a refractive index of more than $\sqrt{(4+2\sqrt{2})}$, has the outer surface 1 having six principal axis planes.

The resonator as arranged above includes all the features described in the principle of total internal reflection (described earlier).

Accordingly, as described in the principle of total internal reflection, according to the resonator as arranged above, any light beam emitted from the hollow part is totally internally reflected in the outer surface 1 does not exit to an outside. However, light brought into contact with the hollow is not only totally internally reflected but also partially transmitted and partially reflected. As described above, according to the resonator as arranged above, two hollow parts, which are not separate from each other, are combined to be a combined hollow in which light comes and goes to/from the two hollow parts. Such a structure enables various practical uses such as provision of (i) a light source in one of the two hollows and (ii) a sample or a measurement device in the other of the two hollows.

FIG. 27 is a perspective view schematically illustrating a resonator to which an optical structure of the present invention is applied and which has a simple and basic structure. The resonator of FIG. 27 has a structure obtained by causing the light guide having the reflection structure (see FIG. 19) to have the reflection structure also on an open end side of the hollow part. Namely, according to the resonator illustrated in FIG. 27, the hollow light guide has, on both sides of the hollow part, the reflection structure of the hollow light guide illustrated in FIG. 19, and a hollow constituted only by the 45 inclined surfaces is provided in a rectangular parallelepiped constituted by the principal axis planes and made of an optical medium. An optical resonator is thus obtained which prevents light from leaking from the hollow to an outside and absolutely prevents light from entering the hollow from the outside.

The resonator as arranged above has a simple structure which is made of a single material and uses neither multilayer structure nor periodical structure, whereas the resonator is a broadband resonator which operates in a wavelength region in which an optical material meets a refractive index requirement. The resonator, which uses only total internal reflection, serves as an ideal optical resonator theoretically having an infinite Q value.

Therefore, the resonator as arranged above is superior to a resonator which uses a photonic crystalline structure that is limited in wavelength region and to a dialectic microsphere in which no space can be secured. The resonator is particularly excellent in that a large space can be secured in a hollow part and various light emitting sources can be provided in the large space.

A resonator which is illustrated in FIG. 28 and in which the outer surface 1 and the inner surface 2 of the resonator illustrated in FIG. 27 have been replaced with each other is identical in function to the resonator illustrated in FIG. 27. Namely, contrary to the resonator illustrated in FIG. 27, the resonator illustrated in FIG. 28 is arranged such that a wall surface of the hollow is constituted by the principal axis planes and an outer surface of an optical medium is constituted by the 45 inclined planes. Further, the resonator illustrated in FIG. 28 is obtained by rotating the entire resonator illustrated in FIG. 27 by 90°, and is arranged to be a perfectly sealed resonator.

A resonator illustrated in FIG. 29 is obtained by causing a body part of the hollow of the resonator illustrated in FIG. 27 to be the shortest (note, however, that the resonator has been rotated by 90° from that illustrated in each of (a) and (b) of FIG. 26). Also according to this, in a case where the inner surface and the outer surface are replaced with each other, it is possible to make a sealed resonator including a hollow having a rectangular parallelepiped.

Further, a resonator illustrated in FIG. 30 is obtained by applying the sealed resonator illustrated in FIG. 29. According to the resonator illustrated in FIG. 30, a plurality of (here, three) resonators illustrated in FIG. 29 are aligned in the y-axis direction. In this case, since light is transmitted through hollows constituting a hollow part, the hollows are combined so that light can come and go to/from the hollows. Note here that a complicated optical system can be made in a case where the hollows serve as an oscillating section, an amplifying section, a control section, etc., respectively. Alternatively, in a case where the resonator has a structure in which resonators are juxtaposed to each other so that only the resonator at the end protrudes to an outside, the resonator functions as a light guide which transmits light in a state in which the hollows are not directly connected to one another. Various functions described above can be incorporated also in such a resonator.

As described above, an optical resonator which uses an optical structure of the present invention has an extremely high Q value since no light leaks to an outside. Therefore, the optical resonator can be used for, for example, a laser having an extremely low lasing threshold. However, since light needs to be extracted from an inside, an optical resonator with which a light inlet/outlet is provided is used (see FIG. 31) instead of the optical resonators as described above and as illustrated in FIGS. 28 and 29.

According to the optical resonator illustrated in FIG. 31, the 45 inclined planes constitute the outer surface 1, and a hollow is formed by the principal axis planes in the optical resonator. The optical resonator has a structure in which a part of the outer surface 1 is constituted by the principal axis planes. These principal axis planes function as a light input/output section. Light having entered an optical medium from the light input/output section is totally internally reflected in the 45 inclined planes without fail. The light, which does not leak to an outside other than the light input/output section, is also transmitted in the principal axis planes of the inner surface 2. Consequently, the light input/output section serves as an input/output section of the optical resonator. Though a Q value of the optical resonator is reduced to some extent since the optical resonator has an outlet of light, no radiation loss occurs in the other part of the optical resonator. This allows the optical resonator to be an ideal optical resonator. In order to obtain a high Q value, it is only necessary that the light input/output section be small in size. In the case of, for example, a laser, it is only necessary to adjust a size of the light input/output section so as to achieve optimum coupling.

FIG. 31 shows an example in which, in a case where the outer surface 1 is the first plane constituted by the 45 inclined planes, a region of the principal axis planes is provided in a part of the outer surface 1 of an optical medium. An arrangement of the region is not limited to this. In a case where the outer surface 1 is the second plane constituted by the principal axis planes, a region of the 45 inclined planes is provided.

According to each of the light guide and the resonator which are described in the above embodiments, light is totally internally reflected in the outer surface 1 and does not exit to an outside. However, strictly, an evanescent wave leaks to the outside from an optical medium even if light is totally internally reflected. Accordingly, in a case where a hollow structure in such a state and another material are brought into contact with each other, light may leak from a part of the contact and may be absorbed into the part. Further, outer covering is necessary from the viewpoint of protection. In addition, in order to use the hollow structure in, for example, an electronic circuit, it is necessary to prepare such a structure on a substrate, and it is also inevitable that the hollow structure is in contact with another substance. This makes it necessary to further provide, on an outside of the outer surface, a buffer layer which prevents a leakage of light without preventing operation of each of the light guide and the resonator.

Note here that according to the structure described above, an optical medium has a refractive index of more than $\Delta \cdot \sqrt{(4+2\sqrt{2})}$ assuming that $\Delta$ is 1 or more. In a case where protection of the refractive index $\Delta$ and a buffer layer are provided on a surface of the optical medium, all conditions for total internal reflection are met, and the structure can not only serve as a protection layer and a buffer layer but also have a function of a supporting layer.

For example, FIG. 32 is a cross-sectional view of an optical structure obtained by providing, on an outside (outer circumferential surface) of the light guide (see FIG. 14) or the resonator (see FIG. 28), a buffer layer having a refractive index $\Delta$ ($\geq 1$), and providing the outside with protection covering. The optical structure provided with the protection covering does not lose its function as the light guide or the resonator even if the optical structure is stretched along a wall or a floor. Note that the buffer layer needs to have a thickness (of approximately several wavelengths or more) which is enough to sufficiently decrease an evanescent wave. A buffer layer may be provided or does not need to be provided on the hollow part side.

FIG. 33 illustrates an arrangement in which a buffer layer is provided on a substrate and a hollow structure which is the main part of the present invention is provided on the buffer layer. In view of a disconnection from an adjacent device, the hollow structure is similarly surrounded by a buffer material. The buffer layer also functions as a stable supporting body of the hollow structure particularly in an example on the right side of FIG. 33. According to the arrangement, it is unnecessary to provide a buffer layer on the hollow part side.

FIG. 34 illustrates an optical structure having a structure in which a part or most of a hollow part (an inside) is filled with a low-refractive index medium and a device (e.g., a light emitting device or a light emission controlling element) having a light emitting/amplifying/controlling function is embedded in the low-refractive index medium.

Note here that, in a case where the low-refractive index medium has a refractive index $\Delta$ ($\geq 1$), it is a matter of course to use, as a main optical medium, a material having a refractive index n that meets $n > \Delta \cdot \sqrt{(4+2\sqrt{2})}$. All light emitted from the main optical medium is confined in this hollow structure regardless of a shape and a refractive index of the embedded device. The device is stably retained by the low-refractive index medium.

According to the hollow structure having the structure illustrated in FIG. 34, the hollow structure which is a resonator serves as a light emitting device such as a low-threshold laser, and the hollow structure which is a coupling resonator or a hollow light guide can have a light amplifying function and a light controlling function.

A gently curved surface having an extremely large curvature radius is substantially a flat surface when locally seen. Accordingly, a non-radiation condition can be approximately obtained in a case where the gently curved surface is one of the principal axis planes and a structure constituted by the 45 inclined planes is formed on or under the gently curved surface by use of an optical medium having a refractive index of slightly more than $\sqrt{(4+2\sqrt{2})}$. Such a structure is exemplified by a large-aperture light guide illustrated in FIG. 35.

<Production of Optical Structure of the Present Invention>

A usable optical medium of which the optical structures described in Embodiments 5 and 6 are made is exemplified by silicon and germanium. In a field of such a material, there are abundant processing techniques and microoptic techniques each of which has been developed for, for example, an optical integrated circuit and a semiconductor laser. Therefore, the optical structures can be produced by use of these techniques.

Note that an optical structure having a size in a unit of mm to several ten cm can also be made by use of machining, polishing, and optical adhesion.

<Application Field>

An optical medium to be used for a hollow structure of the present invention needs to have a refractive index of more than 2.613 . . . .

In view of the circumstances, an optical medium which can be used in a visible wavelength region is exemplified by ZnTe (having a refractive index of 2.92) and SiC (having a refractive index of 2.63). Currently, these materials have a low purity and absorb much light. Therefore, apart from a small device, a large device made of such a material makes it difficult to obtain a high-performance hollow structure. Note that SiC, which is a material useful in many fields and is being researched and developed for higher performance, will be an extremely promising optical medium in the future. Note also that SUMITA OPTICAL GLASS, Inc. is researching and developing glass having a refractive index of not less than 2. Therefore, glass may also serve as an optical medium in the future.

In contrast, an optical medium which can be suitably used in near-infrared and infrared regions is exemplified by many semiconductor materials including Si (having a refractive index of 3.4) and Ge (having a refractive index of 4.0) each of which is transparent and has a large refractive index.

In particular, Si (silicon) is the most dominant semiconductor material. A technique for purity-enhancing and processing Si has been advanced, and Si has already been extensively used for an optical circuit. Therefore, Si can be said to be a material which is suitable for the present invention.

According to an optical structure of the present invention, a non-radiation transmission line, a high Q resonator, a branch, a slow-wave transmission line, and the like can be made of silicon and can also be easily integrated. In this case, in the future, the present invention may be replaced with a photonic crystalline device which is being used in this field.

In a case where the photonic crystalline device and the optical structure of the present invention are combined, it is possible to make a device which is suitable for various effects and various application fields.

Advancement in a SiC technique allows an optical structure of the present invention to be effectively used in, for example, a large-aperture optical pipe for transmission of natural light such as sunlight. The SiC technique, which requires no directivity, allows transmission of any light beam. Therefore, the optical structure of the present invention can be applied to many fields such as energy transmission, medical science (an optical surgical knife), agriculture, and lighting.

In a case where a hollow transmission line which is not limited in wavelength and has no radiation mode can be arranged as in the case of the optical structure of the present invention, neither coupling loss nor radiation loss occurs, so that the present invention is extremely useful for use in high-power optical energy transmission. The present invention also has an advantage such that no light loss occurs since even scattered light due to a scattering substance floating in a hollow part does not exit to an outside. The present invention which has a mode that allows transmission of light without radiating the light even if the light zigzags violently is useful also as a slow-wave transmission line.

A high Q resonator using a photonic crystal has recently been researched, and counters the present invention. However, as described in the section of Background Art, the high Q resonator which uses a periodical structure substantially equivalent to a wavelength is limited in wavelength region in which the high Q resonator operates as a resonator. Depending on a case, the high Q resonator is also limited in direction in which light is emitted in the high Q resonator.

In contrast, according to an optical substance of the present invention, light can be totally internally reflected in any wavelength region and in any direction provided that an optical medium meets a refractive index requirement which cannot be met by the high Q resonator using a photonic crystal described above. The optical substance of the present invention yields an effect of making an optical resonator which has an extremely high Q value and a simple arrangement. Further, the optical substance of the present invention also allows one layer to be made of one material. Also in terms of this point, the optical substance of the present invention has the possibility of being more useful than a photonic crystal.

Note that a combination of the above embodiments can be applied not only to a resonator but also to a light guide and an optical device, so that the present invention should have better patentability.

Each of the structures disclosed in Embodiments 1 through 4 has a structure which is a polyhedron or a sphere that is surrounded by a reflective material so that an inside of the optical structure is a hollow part, the reflective material being made of an optical medium which transmits light, and having (i) a first plane which is a surface on which inclined planes are aligned with no gap therebetween and (ii) a second plane which is opposite to the first plane and is a flat surface or an approximately planar and gently curved surface, and the first plane having a shape and a refractive index such that at any time, light having entered the first plane or the second plane enters, at an entrance angle larger than a critical angle of total internal reflection, a corresponding opposite one of the first plane and the second plane (i) directly from an inside of the reflective material or (ii) from the inside of the reflective material after having experienced repeated internal reflection.

Therefore, light having entered one of planes of a reflective material cannot pass through the other of the planes and returns to the entrance surface side. Therefore, the present structure which is surrounded by the reflective material so that an inside of the structure is a hollow part can have an extremely high optical Q value which prevents a leakage of light, and can function as an optical experimental sphere or an optical experimental polyhedron, or a decorative lighting apparatus or an artificial jewel which brightly glitters while being hollow and light.

Each of the other structures disclosed in Embodiments 1 through 4 has a structure which is a polyhedron or a sphere that is surrounded by a reflective material so that an inside of the optical structure is a hollow part, the reflective material being made of an optical medium which transmits light, and having (i) a first plane which is a surface on which inclined planes are aligned with no gap therebetween and (ii) a second plane which is opposite to the first plane and is a flat surface or an approximately planar and gently curved surface, and the first plane having a shape and a refractive index such that the first plane totally internally reflects light which enters the second plane at an entrance angle smaller than a given entrance angle and the first plane transmits a part of light which enters the second plane at an angle larger than the given entrance angle.

Therefore, light having entered a reflective material from one of planes of the reflective material is totally internally reflected or allowed to be partially transmitted depending on its entrance angle. Further, transmitted light, which passes through a flat surface serving as the second plane and an inclined plane of the first plane, is refracted by a prism effect. This make it possible to obtain an unexpected optical characteristic such that eyes will see an edge when the eyes try to see a right front direction, or eyes will see the right front direction when the eyes try to see the edge, and to cause the another optical structure in which a light source is provided to function as, for example, decorative lighting.

A combination of the structures disclosed in Embodiments 1 through 4 and the optical structures disclosed in Embodiments 5 and 6 yields a further effect than the structures described in the respective embodiments.

According to Embodiments 1 through 4, the present invention is merely applicable to a reflective plate and a light confinement box. Meanwhile, according to Embodiments 5 through 6, the present invention can be extensively practically developed for use in optical electronics such as a confinement box (resonator), a waveguide, a light extraction, a coupling resonator, amplification, and control.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

According to the present invention, a structure can be lighter and larger which causes light from any angle to be totally internally reflected and prevents the light from exiting from an inside to an outside thereof, the inside being a hollow or a structure which allows light entering the structure from the outside at any entrance angle to be totally internally reflected so as to prevent the light from entering the inside. The present invention can be used for an optical experimental sphere or an optical experimental polyhedron. Alternatively, the present invention makes it possible to (i) provide a structure which has an optical characteristic that cannot be attained by, for example, a conventional mirror ball, a conventional lighting apparatus, and a conventional jewel, (ii) use the structure for decorative illumination and an artificial jewel, and (iii) suitably use the structure in an optical field, especially in fields of, for example, optical transmission and resonance.

REFERENCE SIGNS LIST

1 Outer Surface
2 Inner Surface
10 Reflective Material
11 First Plane
12 Second Plane

The invention claimed is:

1. An optical structure having two surfaces that are different in arrangement on both sides, and being made of an optical medium that is light transmissive, the optical medium having a refractive index n of more than $\sqrt{(4+2\sqrt{2})}$, one of the two surfaces of the optical structure being entirely formed by combining one or more 45° inclined planes each of which is a flat surface whose normal line is orthogonal to one of principal axes x, y, and z of a rectangular coordinate system and is located at an angle of 45° with respect to each of the other two of the principal axes, the other of the two surfaces being entirely formed by combining one or more principal axis planes each of which is a flat surface whose normal line is in parallel with any one of the principal axes x, y, and z of the rectangular coordinate system, and the one and the other of the two surfaces not overlapping each other, in a case where light beams having entered the one or more 45° inclined planes from an outside of the optical medium at any entrance angle enters the one or more principal axis planes either directly or after having experienced multiple internal reflection, the light beams being brought into contact with the one or more principal axis planes at an angle equal to or larger than a critical angle of total internal reflection without fail, and being prevented from being transmitted through the one or more principal axis planes by being totally reflected by the one or more principal axis planes, and in a case where light beams having entered the one or more principal axis planes from the outside of the optical medium at any entrance angle enters the one or more 45° inclined planes either directly or after having experienced multiple internal reflection, the light beams being brought into contact with the one or more 45° inclined planes at an angle equal to or larger than the critical angle of total internal reflection without fail, and being prevented from being transmitted through the one or more 45° inclined planes by being totally reflected by the one or more 45° inclined planes.

2. An optical structure having two surfaces that are different in arrangement on both sides, and being made of an optical medium that is light transmissive, the optical medium having a refractive index n of more than $\Delta \cdot \sqrt{(4+2\sqrt{2})}$ ($\Delta \geq 1$), one of the two surfaces of the optical structure being entirely formed by combining one or more 45° inclined planes each of which is a flat surface whose normal line is orthogonal to one of principal axes x, y, and z of a rectangular coordinate system and is located at an angle of 45° with respect to each of the other two of the principal axes, the other of the two surfaces being entirely formed by combining one or more principal axis planes each of which is a flat surface whose normal line is in parallel with any one of the principal axes x, y, and z of the rectangular coordinate system, the one and the other of the two surfaces not overlapping each other, and an optical medium layer being provided on an outside of either one or each of the two surfaces, the optical medium layer having a refractive index of $\Delta$, in a case where light beams having entered the one or more 45° inclined planes from an outside of the optical medium at any entrance angle enters the one or more principal axis planes either directly or after having experienced multiple internal reflection, the light beams being brought into contact with the one or more principal axis planes at an angle equal to or larger than a critical angle of total internal reflection without fail, and being prevented from being transmitted through the one or more principal axis planes by being totally reflected by the one or more principal axis planes, and in a case where light beams having entered the one or more principal axis planes from the outside of the optical medium at any entrance angle enters the one or more 45° inclined planes either directly or after having experienced multiple internal reflection, the light beams being brought into contact with the one or more 45° inclined planes at an angle equal to or larger than the critical angle of total internal reflection without fail, and being prevented from being transmitted through the one or more 45° inclined planes by being totally reflected by the one or more 45° inclined planes.

3. An optical structure having at least one hollow part which is provided in an optical medium that is light transmissive, the optical medium having a refractive index n of more than $\sqrt{(4+2\sqrt{2})}$, the optical medium being formed by a combined 45° inclined plane and a combined principal axis plane, the combined 45° inclined plane being formed by combining a plurality of 45° inclined planes each of which is a flat surface whose normal line is orthogonal to one of principal axes x, y, and z of a rectangular coordinate system and is located at an angle of 45° with respect to each of the other two of the principal axes, the combined principal axis plane overlapping no combined 45° inclined plane, and being formed by combining a plurality of principal axis planes each of which is a flat surface whose normal line is in parallel with any one of the principal axes x, y, and z of the rectangular coordinate system, the at least one hollow part being surrounded by one of the combined 45° inclined plane and the combined principal axis plane, in a case where light beams having entered the combined 45° inclined plane from an outside of the optical medium at any entrance angle enters the combined principal axis plane either directly or after having experienced multiple internal reflection, the light beams being brought into contact with the combined principal axis plane at an angle equal to or larger than a critical angle of total internal reflection without fail, and being prevented from being transmitted through the combined principal axis plane by being totally reflected by the combined principal axis plane, and in a case where light beams having entered the combined principal axis plane from the outside of the optical medium at any entrance angle enters the combined 45° inclined plane either directly or after having experienced multiple internal reflection, the light beams being brought into contact with the combined 45° inclined plane at an angle equal to or larger than the critical angle of total internal reflection without fail, and being prevented from being transmitted through the combined 45° inclined plane by being totally reflected by the combined 45° inclined plane.

4. The optical structure as set forth in claim 3, wherein the at least one hollow part includes a plurality of hollow parts in the optical medium.

5. An optical structure comprising at least one optical structure recited in claim 3 which is provided in the at least one hollow part of the optical medium via a gap.

6. The optical structure as set forth in claim 3, wherein a region of 45° inclined planes is provided in a part of an outer surface of the optical medium in a case where the outer surface is the combined principal axis plane formed of the plurality of principal axis planes, and a region of principal axis planes is provided in the part of the outer surface of the optical medium in a case where the outer surface is the combined 45° inclined plane formed of the plurality of 45° inclined planes.

7. The optical structure as set forth in claim 3, wherein:

in a case where the optical medium has a refractive index n of more than $\Delta \cdot \sqrt{(4+2\sqrt{2})}$ ($\Delta \geq 1$), a layer is provided on an outer circumferential surface of the optical medium, the layer being made of an optical material having a refractive index of $\Delta$.

8. An optical structure being made of a first optical medium that is light transmissive, the first optical medium having a refractive index n of more than $\Delta \cdot \sqrt{(4+2\sqrt{2})}$ ($\Delta \geq 1$), the first optical medium being formed by a combined 45° inclined plane and a combined principal axis plane, the combined 45° inclined plane being formed by combining a plurality of 45° inclined planes each of which is a flat surface whose normal line is orthogonal to one of principal axes x, y, and z of a rectangular coordinate system and is located at an angle of 45° with respect to each of the other two of the principal axes, the combined principal axis plane overlapping no combined 45° inclined plane, and being formed by combining a plurality of principal axis planes each of which is a flat surface whose normal line is in parallel with any one of the principal axes x, y, and z of the rectangular coordinate system, and a space being filled with a second optical medium having a refractive index of $\Delta$, the space being surrounded by one of the combined 45° inclined plane and the combined principal axis plane, in a case where light beams having entered the combined 45° v inclined plane from an outside of the first optical medium at any entrance angle enters the combined principal axis plane either directly or after having experienced multiple internal reflection, the light beams being brought into contact with the combined principal axis plane at an angle equal to or larger than a critical angle of total internal reflection without fail, and being prevented from being transmitted through the combined principal axis plane by being totally reflected by the combined principal axis plane, and in a case where light beams having entered the combined principal axis plane from the outside of the first optical medium at any entrance angle enters the combined 45° inclined plane either directly or after having experienced multiple internal reflection, the light beams being brought into contact with the combined 45° inclined plane at an angle equal to or larger than the critical angle of total internal reflection without fail, and being prevented from being transmitted through the combined 45° inclined plane by being totally reflected by the combined 45° inclined plane.

9. The optical structure as set forth in claim 8, comprising a light emitting device or a light emission controlling element embedded in a region filled with the second optical medium having a refractive index of $\Delta$.

* * * * *